(12) United States Patent
Lazar

(10) Patent No.: US 8,621,178 B1
(45) Date of Patent: Dec. 31, 2013

(54) TECHNIQUES FOR DATA STORAGE ARRAY VIRTUALIZATION

(75) Inventor: Gregory W. Lazar, Upton, MA (US)

(73) Assignee: EMC Corporation, Hopkinton, MA (US)

( * ) Notice: Subject to any disclaimer, the term of this patent is extended or adjusted under 35 U.S.C. 154(b) by 189 days.

(21) Appl. No.: 13/200,288

(22) Filed: Sep. 22, 2011

(51) Int. Cl.
*G06F 12/00* (2006.01)

(52) U.S. Cl.
USPC ............................ 711/173; 711/117; 711/163

(58) Field of Classification Search
None
See application file for complete search history.

(56) References Cited

U.S. PATENT DOCUMENTS

| | | | |
|---|---|---|---|
| 7,739,470 B1 | 6/2010 | Norgren | |
| 7,757,013 B1 | 7/2010 | Lawson et al. | |
| 2007/0050764 A1* | 3/2007 | Traut | 718/1 |

OTHER PUBLICATIONS

Hitachi Data Systems, "Hitachi Virtual Partition Manager Software", Jun. 2005, 4 Pages.
"HP 3PAR Virtual Domains Software—Overview & Features", 2011, 2 pages.
"HP 3PAR software family", Data Sheet, 4AA2-8396ENW, Created Aug. 2011, 16 Pages.

* cited by examiner

*Primary Examiner* — Shawn X Gu
(74) *Attorney, Agent, or Firm* — Muirhead and Saturnelli, LLC

(57) ABSTRACT

Described are techniques for performing data storage system management. The data storage system is divided into a plurality of virtual partitions. A plurality of policy sets are specified where each of the policy sets includes one or more policies. One of the plurality of policy sets is assigned to each of the plurality of virtual partitions. Each of the plurality of policy sets includes an access control policy that assigns a portion of data storage of the data storage system as a resource for exclusive use in one of the plurality of virtual partitions that is assigned said each policy set.

19 Claims, 21 Drawing Sheets

TECHNIQUES FOR DATA STORAGE ARRAY VIRTUALIZATION

BACKGROUND

1. Technical Field

This application generally relates to data storage, and more particularly to techniques used in connection with data storage system management.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices, or logical volumes (LVs). The logical disk units may or may not correspond to the actual disk drives. Allowing multiple host systems to access the single storage device unit allows the host systems to share data stored therein.

SUMMARY OF THE INVENTION

In accordance with one aspect of the invention is a method of performing data storage system management comprising: dividing the data storage system into a plurality of virtual partitions; specifying a plurality of policy sets, each of said policy sets including one or more policies; and assigning one of said plurality of policy sets to each of said plurality of virtual partitions, wherein each of said plurality of policy sets includes an access control policy that assigns a portion of data storage of the data storage system as a resource for exclusive use in one of the plurality of virtual partitions that is assigned said each policy set. The access control policy may identify one or more objects representing storage devices of the data storage system for exclusive use in said one virtual partition. The one or more objects may each represent any of a logical storage device, a physical storage device, a storage pool of one or more physical devices, and a storage group of one or more logical storage devices. Each of the plurality of virtual partitions may have one of a plurality of partition administrators that performs data storage management only for resources assigned to said each virtual partition, wherein a first access control policy of a first of the plurality of policy sets may assign a first portion of data storage to a first of said plurality of virtual partitions and a second access control policy of a second of the plurality of policy sets may assign a second portion of data storage to a second of said plurality of virtual partitions, and wherein a first partition administrator for the first virtual partition may be allowed to perform data storage management of the first portion and may not be allowed access to perform operations on the second portion. A second partition administrator for the second virtual partition may be allowed to perform data storage management of the second portion and may not be allowed access to perform operations on the first portion. A global data storage administrator having access to all data storage of the data storage system may perform said dividing, said specifying and said assigning. Each of the plurality of data storage administrators may be assigned a role including any of a manager, a monitor, and a replicator. The manager of a partition may be allowed to provision storage from a storage pool assigned to the partition in order to create logical devices for the partition, may be allowed to create storage groups for the partition from logical devices of the partition, and may be allowed to assign a data storage client of the partition to a first storage group of logical devices thereby allowing the data storage client to perform data storage operations to store and retrieve data from the first storage group. The monitor of a partition may only be allowed to view information regarding assigned objects of the partition and may not be allowed to perform other operations on assigned objects of the partition. The replicator of a partition may only be allowed to perform replication operations on assigned data storage of the partition. Each of the plurality of policy sets may include a performance policy that assigns one or more performance limits for controlling use of data storage system resources by consumers of one of the plurality of virtual partitions that is assigned said each policy set. The performance policy may specify a quantity for a performance-based metric, said quantity representing a performance limit for the performance-based metric that is any of bandwidth, I/O throughput, and response time. Response time may be an average time for an I/O request to be serviced by the data storage system including any wait time. Bandwidth may be an average amount of data in connection with read and/or write I/O requests processed by the data storage system per unit of time. Throughput may be an average number of I/O requests serviced by the data storage system per unit of time. Objects assigned to each of the plurality of virtual partitions may include a first object set representing resources assigned to said each partition for use by said each virtual partition and a second object set representing consumers assigned to said each virtual partition, wherein for a consumer of said each partition to have access to a resource represented by a first object of said each partition, the consumer is assigned to the first object. The performance policy may include one or more thresholds of a first resource, each of said one or more thresholds specifying a resource limit for the first resource which is any of processor utilization, memory, and cache. The data storage system may include a plurality of storage tiers. Each of the plurality of storage tiers may include physical storage devices of the data storage system having different physical storage performance characteristics. Each of the plurality of policy sets may include a storage allocation policy that specifies one or more threshold amounts for each of the plurality of storage tiers for use by a virtual partition assigned said storage allocation policy. The performance policy may be assigned a predetermined quality of service level, and wherein the performance policy may specify one or more threshold amounts that are used as said one or more performance limits and are determined in accordance with the predetermined quality of service level. The plurality of storage tiers may include a first tier of flash drives, and one or more tiers of disk drives. The data storage system may be a single physical data storage array. The data storage system may includes a plurality of data storage arrays.

In accordance with another aspect of the invention is a computer readable medium comprising code stored thereon for performing data storage system management, the computer readable medium comprising code for: dividing the data storage system into a plurality of virtual partitions; specifying a plurality of policy sets, each of said policy sets including one or more policies; and assigning one of said plurality of policy sets to each of said plurality of virtual partitions, wherein each of said plurality of policy sets includes an access control policy that assigns a portion of data storage of the data storage system as a resource for exclusive use in one of the plurality of virtual partitions that is assigned said each policy set. The access control policy may identify one or more objects representing storage devices of the data storage system for exclusive use in said one virtual partition. The one or more objects may each represent any of a logical storage device, a physical storage device, a storage pool of one or more physical devices, and a storage group of one or more logical storage devices.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
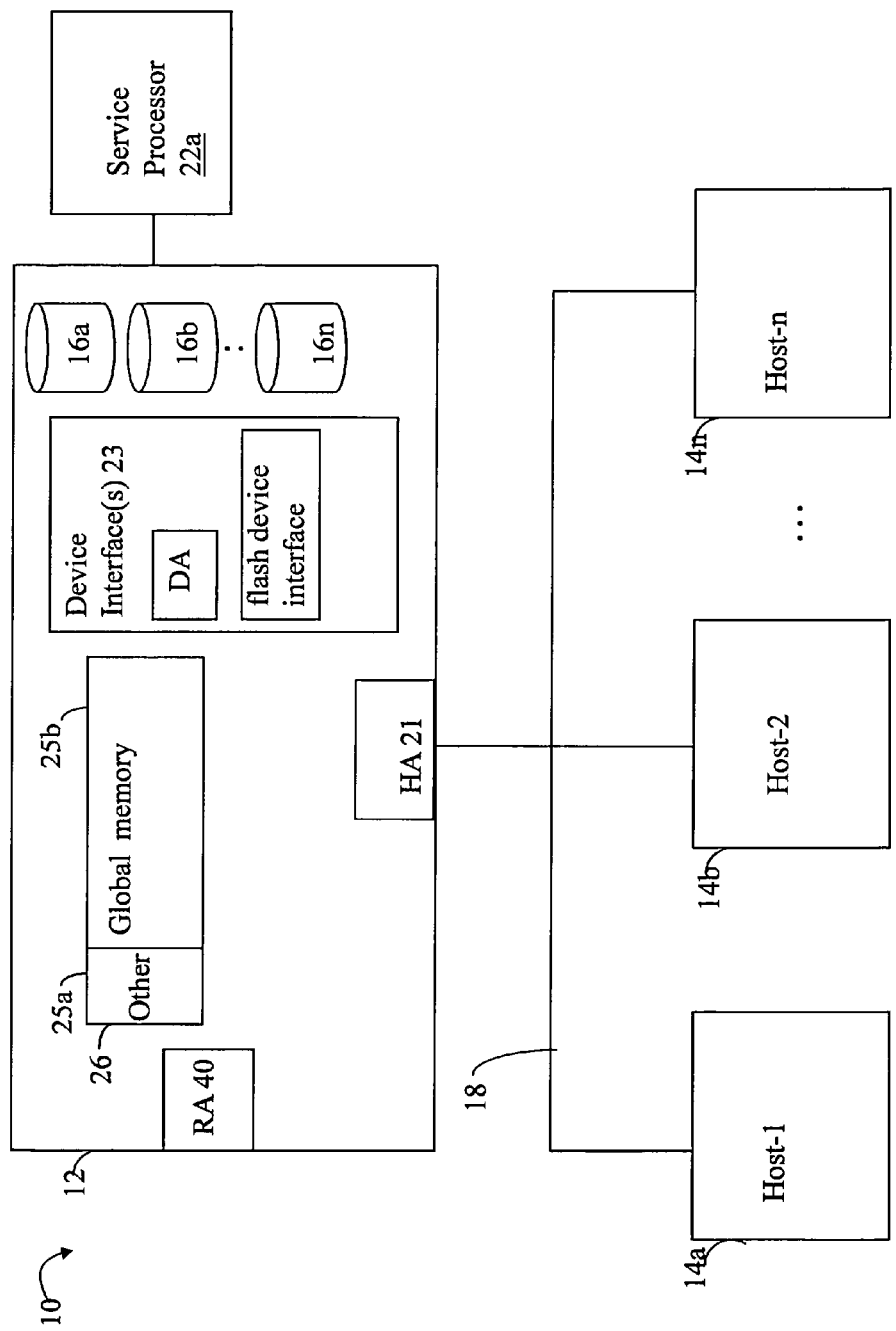
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such as a Connectrix or other switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple physical data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. As described in more detail in following paragraphs, the techniques herein may be used in an embodiment in which one or more of the devices 16a-16n are flash drives or devices. More generally, the techniques herein may also be used with any type of SSD although following paragraphs may make reference to a particular type such as a flash device or flash memory device.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices or logical volumes (LVs). The LVs may or may not correspond to the actual physical devices or drives 16a-16n. For example, one or more LVs may reside on a single physical drive or multiple drives. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LV(s) residing thereon. A flash device interface may be another type of device interface used in connection with facilitating data transfers to/from the associated flash devices and LV(s) residing thereon. It should be noted that an embodiment may use the same or a different device interface for one or more different types of devices than as described herein.

The device interface, such as a DA, performs I/O operations on a drive 16a-16n. In the following description, data residing on an LV may be accessed by the device interface following a data request in connection with I/O operations that other directors originate. Data may be accessed by LV in which a single device interface manages data requests in connection with the different one or more LVs that may reside on a drive 16a-16n. For example, a device interface may be a DA that accomplishes the foregoing by creating job records for the different LVs associated with a particular device. These different job records may be associated with the different LVs in a data structure stored and managed by each device interface.

Also shown in FIG. 1 is a service processor 22a that may be used to manage and monitor the system 12. In one embodiment, the service processor 22a may be used in collecting performance data, for example, regarding the I/O performance in connection with data storage system 12. This performance data may relate to, for example, performance measurements in connection with a data request as may be made from the different host computer systems 14a 14n. This performance data may be gathered and stored in a storage area. Additional detail regarding the service processor 22a is described in following paragraphs.

It should be noted that a service processor 22a may exist external to the data storage system 12 and may communicate with the data storage system 12 using any one of a variety of communication connections. In one embodiment, the service processor 22a may communicate with the data storage system 12 through three different connections, a serial port, a parallel port and using a network interface card, for example, with an Ethernet connection. Using the Ethernet connection, for example, a service processor may communicate directly with DAs and HAs within the data storage system 12.

Figure 2:
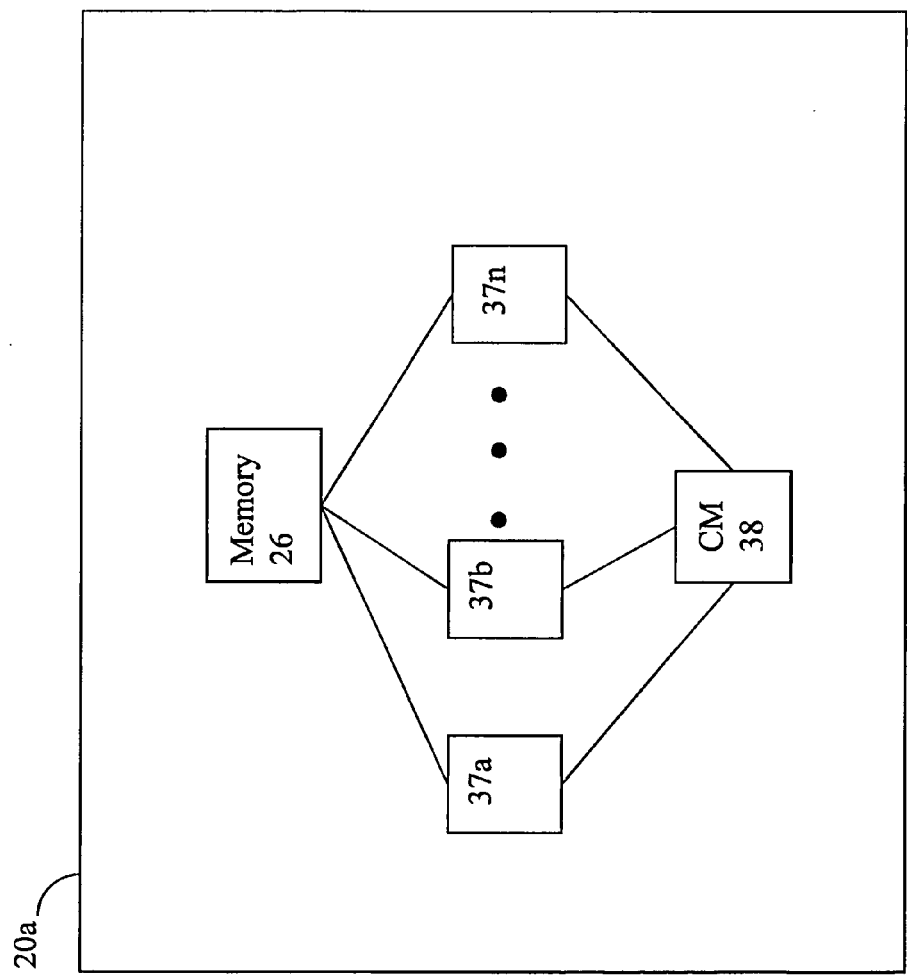
FIG. 2 is a representation of the logical internal communications between the directors and memory included in one embodiment of a data storage system of FIG. 1.

Referring to FIG. 2, shown is a representation of the logical internal communications between the directors and memory included in a data storage system. Included in FIG. 2 is a plurality of directors 37a-37n coupled to the memory 26. Each of the directors 37a-37n represents one of the HAs, RAs, or device interfaces that may be included in a data storage system. In an embodiment disclosed herein, there may be up to sixteen directors coupled to the memory 26.

Other embodiments may allow a maximum number of directors other than sixteen as just described and the maximum number may vary with embodiment.

The representation of FIG. 2 also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

With reference back to FIG. 1, components of the data storage system may communicate using GM 25b. For example, in connection with a write operation, an embodiment may first store the data in cache included in a portion of GM 25b, mark the cache slot including the write operation data as write pending (WP), and then later destage the WP data from cache to one of the physical storage devices 16a-16n. In connection with returning data to a host from one of the devices as part of a read operation, the data may be copied from the physical device by the appropriate device interface, such as a DA servicing the device. The device interface may copy the data read into a cache slot included in GM which is, in turn, communicated to the appropriate HA in communication with the host.

As described above, the data storage system 12 may be a data storage array including a plurality of data storage devices 16a-16n in which one or more of the devices 16a-16n are flash memory devices employing one or more different flash memory technologies. In the foregoing data storage array, the data storage devices 16a-16n may include a combination of disk devices (such as rotating disk drives) and flash devices in which the flash devices may appear as standard Fibre Channel (FC) drives to the various software tools used in connection with the data storage array. The flash devices may be constructed using nonvolatile semiconductor NAND flash memory. The flash devices may include one or more SLC (single level cell) devices and/or MLC (multi level cell) devices.

An embodiment in accordance with the techniques herein may generally include any type of flash device, or more generally, any SSD technology as well as other non-SSD storage device technologies such as rotating disk drives.

An embodiment in accordance with techniques herein may have one or more defined storage tiers. Each tier may generally include physical storage devices or drives having one or more attributes associated with a definition for that tier. For example, one embodiment may provide a tier definition based on a set of one or more attributes. The attributes may include any one or more of a storage type or storage technology, a type of data protection, device performance characteristic(s), storage capacity, and the like. The storage type or technology may specify whether a physical storage device is an SSD drive (such as a flash drive), a particular type of SSD drive (such using flash or a form of RAM), a type of magnetic disk or other non-SSD drive (such as an FC drive, a SATA (Serial Advanced Technology Attachment) drive), and the like. Data protection may specify a type or level of data storage protection such, for example, as a particular RAID level (e.g., RAID1, RAID-5 3+1, RAIDS 7+1, and the like). Performance characteristics may relate to different performance aspects of the physical storage devices of a particular type or technology. For example, there may be multiple types of rotating disk FC drives based on the RPM characteristics of the FC drives (e.g., 10K RPM FC drives and 15K RPM FC drives) and FC drives having different RPM characteristics may be included in different storage tiers. Storage capacity may specify the amount of data, such as in bytes, that may be stored on the drives. An embodiment may allow a user to define one or more such storage tiers. For example, an embodiment in accordance with techniques herein may define two storage tiers including a first tier of all SSD drives and a second tier of all non-SSD drives. As another example, an embodiment in accordance with techniques herein may define three storage tiers including a first tier of all SSD drives which are flash drives, a second tier of all FC disk drives, and a third tier of all SATA drives. In connection with the foregoing three storage tiers, each may have a relative performance storage tier ranking with the first tier having the highest performance, followed by the second and then the third tier in terms of performance. The performance may be based on physical drive characteristics related to the different drive technologies. The foregoing are some examples of storage tier definitions and other tier definitions may be specified in accordance with techniques herein.

What will be described below are techniques that may be used in connection with virtualization of a single data storage system, such as a single data storage array, into a plurality of virtualized segments or virtual partitions. A virtual partition may be characterized as an abstraction of a physical data storage system where different objects representing data storage system resources, consumers of data storage system resources (e.g., client of the data storage system such as a host or server), and the like, may be assigned to a virtual partition. An object, such as representing a resource or a client with respect to the data storage system, may be exclusively assigned to a single virtual partition thereby disallowing access, control, use and the like, by other consumers of other virtual partition. Such resources may alternatively be assigned to a selected one or more virtual partitions of the data storage system. Additionally, one or more different policies may be applied to each virtual partition. A different set of one or more policies may be assigned to each of the virtual partitions in a data storage system. Such policies may include, for example, an access control policy, performance policy, as well others. Virtual partitioning may be desirable for use with any one or more different applications. For example, there may be multiple tenants or entities which may utilize the same physical data storage array and it may be desirable to use techniques herein to create virtual partitions for the different entities using the services and resource of the data storage array so that each partition and its assigned objects may be independently controlled and managed. The foregoing may provide the appearance of having multiple separate and independent "virtual" data storage arrays corresponding to the virtual partitions of a single physical data storage array. The foregoing is described in more detail elsewhere herein.

It should be noted that in following paragraphs, examples may refer to creation and use of virtual partitions with respect to a single data storage system, such as a data storage array. However, it will be appreciated by those of ordinary skill in the art that the techniques herein of virtual partitions may be applied collectively to multiple physical data storage systems. In such an embodiment, the resources, consumers, and the like, of the multiple data storage systems may have virtual partitions created based on the aggregation of the multiple data storage system so that a single virtual partition may, for example, include objects representing resources on multiple different physical data storage systems.

Figure 3:
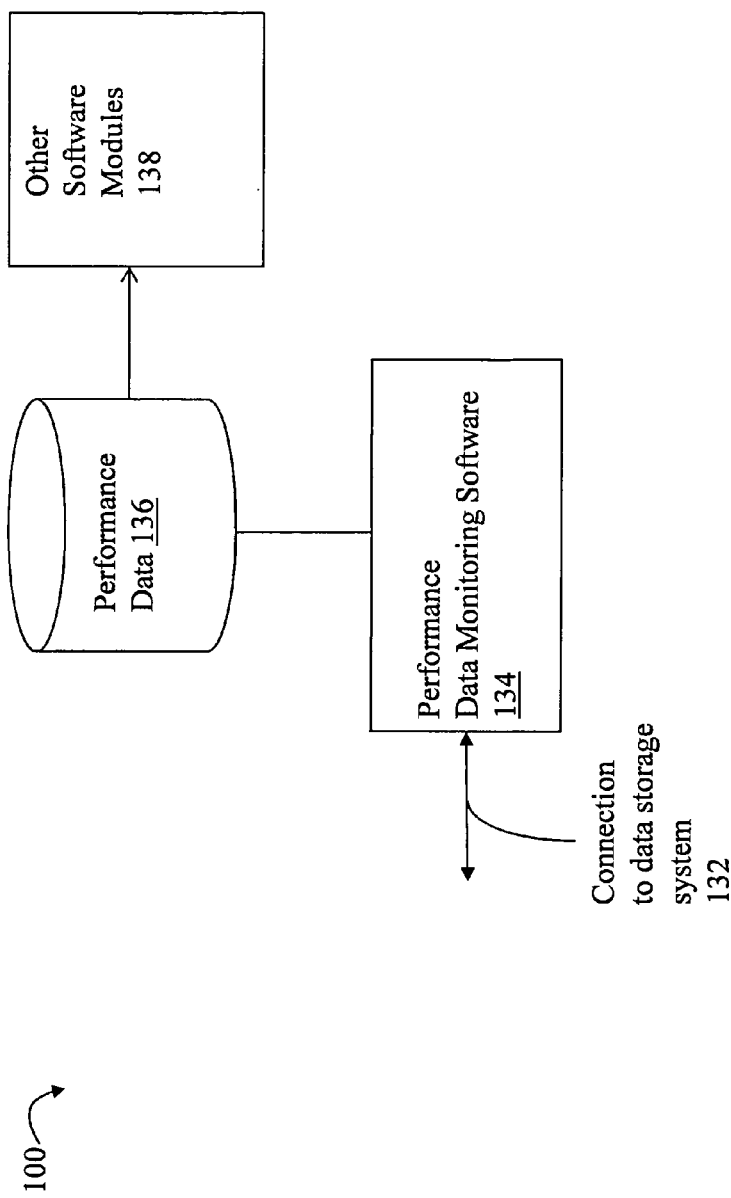
FIG. 3 is an example representing components that may be included in a service processor in an embodiment in accordance with techniques herein.

Referring to FIG. 3, shown is an example 100 of software that may be included in a service processor such as 22a. It should be noted that the service processor may be any one of a variety of commercially available processors, such as an Intel-based processor, and the like. Although what is described herein shows details of software that may reside in the service processor 22a, all or portions of the illustrated components may also reside elsewhere such as, for example, on any of the host systems 14a 14n.

Included in the service processor 22a is performance data monitoring software 134 which gathers performance data about the data storage system 12 through the connection 132. The performance data monitoring software 134 gathers and stores performance data which may be stored in the performance data file 136. This performance data 136 may also serve as an input to one or more other software modules or components 138, such as a policy module, that performs processing in connection with monitoring and enforcing a defined policy for a virtual partition as described elsewhere herein in more detail. For example, the performance data 136 may be used by the policy module to obtain metrics described and used in connection with techniques herein for monitoring and enforcing a performance policy. The policy module may access the performance data collected, for example, to determine a workload or performance-related metrics for one or more physical devices, logical devices or volumes (LVs), and the like. The workload, as may be determined based on one or more performance-related metrics, may also be characterized as a measurement or level of "how busy" a device, or portion thereof is, for example, in terms of I/O operations (e.g., I/O throughput such as number of I/Os/second, and the like).

It should be noted that the operations of read and write with respect to an LV, physical device, and the like, may be viewed as read and write requests or commands from the DA, device controller or other backend physical device interface. Thus, these are operations may also be characterized as a number of operations with respect to the physical storage device (e.g., number of physical device reads, writes, and the like, based on physical device accesses). This is in contrast to observing or counting a number of particular type of I/O requests (e.g., reads or writes) as issued from the host and received by a front end component such as an FA. To illustrate, a host read request may not result in a read request or command issued to the DA if there is a cache hit and the requested data is in cache. The host read request results in a read request or command issued to the DA to retrieve data from the physical drive only if there is a read miss. Furthermore, when writing data of a received host I/O request to the physical device, the host write request may result in multiple reads and/or writes by the DA in addition to writing out the host or user data of the request. For example, if the data storage system implements a RAID data protection technique, such as RAID-5, additional reads and writes may be performed such as in connection with writing out additional parity information for the user data. Thus, observed data gathered to determine workload, such as observed numbers of reads and writes, may refer to the read and write requests or commands performed by the DA. Such read and write commands may correspond, respectively, to physical device accesses such as disk reads and writes that may result from a host I/O request received by an FA.

Figure 4:
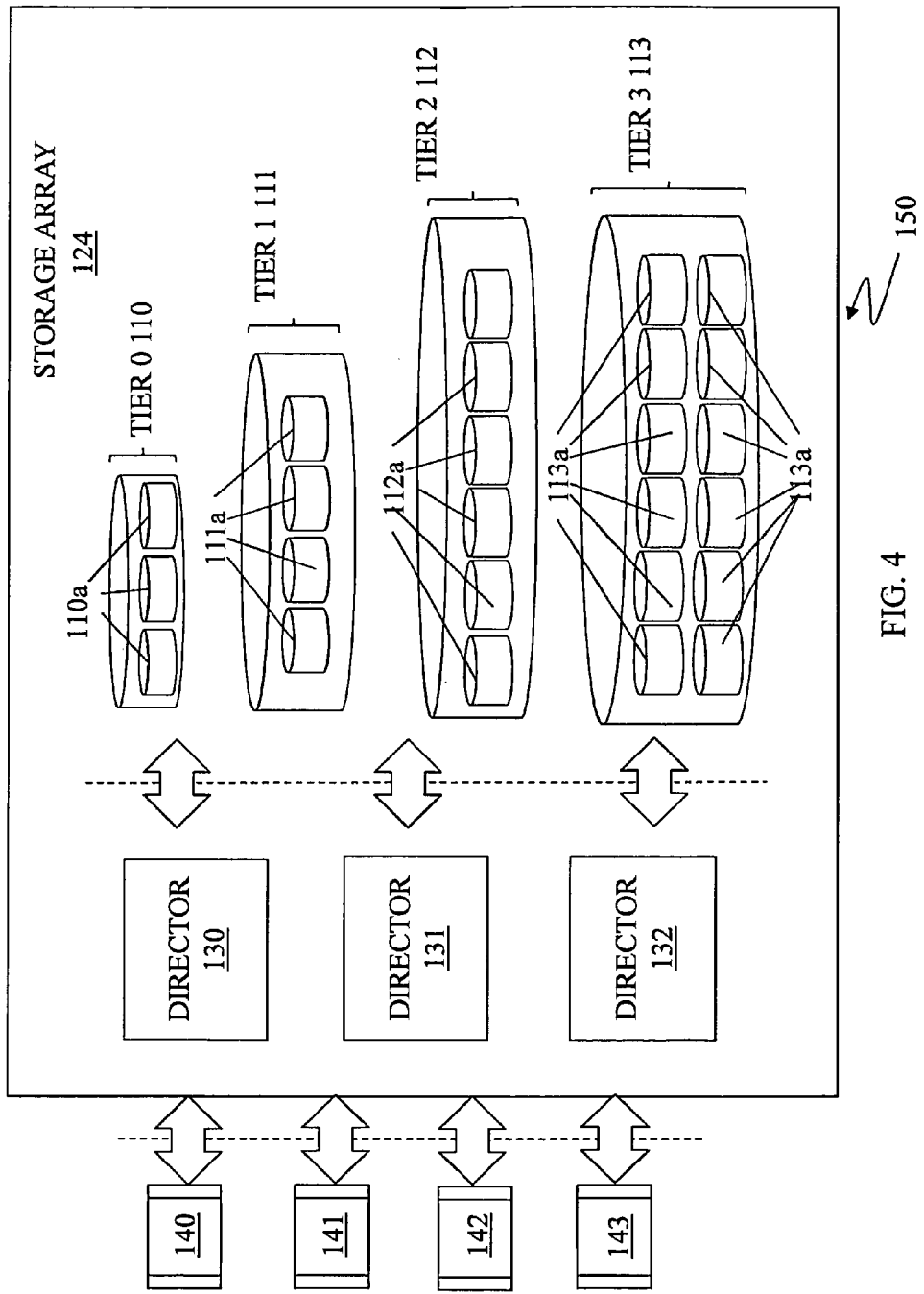
FIG. 4 is an example illustrating a data storage system, such as data storage array, including a plurality of storage tiers in an embodiment in accordance with techniques herein.

FIG. 4 is a schematic illustration showing a storage system 150 that may be used in connection with an embodiment of the system described herein. The storage system 150 may include a storage array 124 having multiple directors 130-132 and multiple storage tiers 110-113 each including, respectively, multiple storage volumes (e,g, LVs, logical devices) 110a-113a. Host applications 140-144 and/or other data storage system client entities (e.g., other storage devices, SAN switches, etc.) request data writes and data reads to and from the storage array 124 that are facilitated using one or more of the directors 130-132. The storage array 124 may include similar features as that discussed above.

The volumes 110a-113a may be provided in multiple storage tiers 110-113 that may have different storage characteristics, such as speed, cost, reliability, availability, security and/or other characteristics. As described above, a tier may represent a set of storage resources, such as physical storage devices, residing in a storage platform. Examples of storage disks that may be used as storage resources within a storage array of a tier may include sets SATA disks, FC disks and/or EFDs (enterprise flash devices or drives), among other known types of storage devices.

According to various embodiments, each of the volumes 110a-113a may be located in different storage tiers as illustrated. Tiered storage provides that data may be initially allocated to a particular fast volume/tier, but a portion of the data that has not been used over a period of time (for example, three weeks) may be stored in a slower (and perhaps less expensive) tier. For example, data that is expected to be used frequently, for example database indices, may be initially written directly to fast storage whereas data that is not expected to be accessed frequently, for example backup or archived data, may be initially written to storage of a different, slower storage tier.

In connection with virtual partitions as described in more detail elsewhere herein, resources of the data storage system such as the physical and/or logical devices as well as portions thereof, and data storage system clients, such as the hosts and host applications, may be assigned to various virtual partitions.

Figure 5:
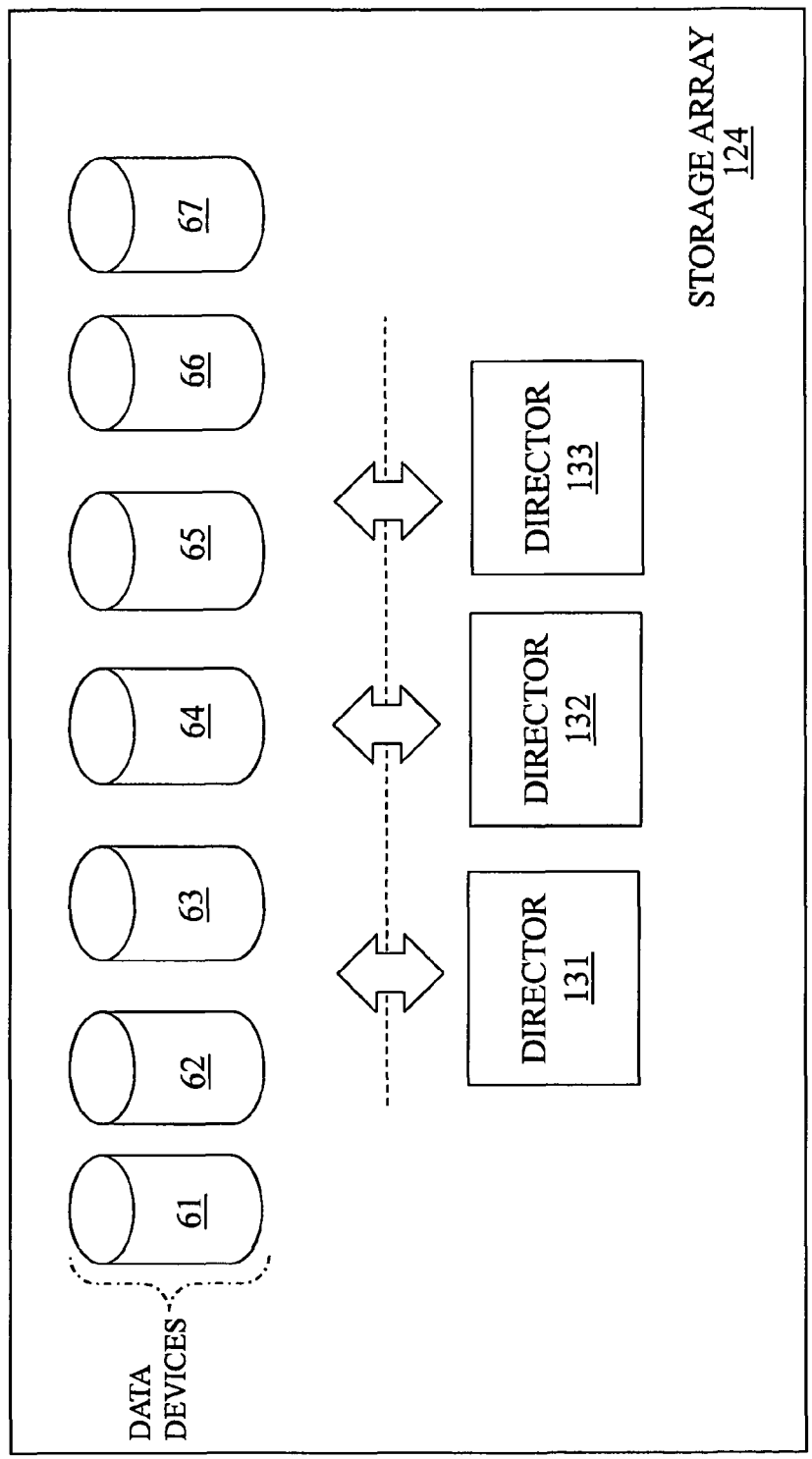
FIG. 5 is an example illustrating directors accessing different devices in an embodiment in accordance with techniques herein.

Referring to FIG. 5, shown is a schematic diagram of the data storage array 124 as including a plurality of data devices 61-67 communicating with directors 131-133. The data devices 61-67 may be implemented as logical devices such as LVs. Each of the data devices 61-67 may correspond to a portion (including a whole portion) of one or more disk drives. Thus, for example, the data device 61 may correspond to an entire disk drive or physical storage device, may correspond to a portion of the physical disk drive or other physical device, or may correspond to a first portion of a first physical device and a second portion of a different physical device. The data devices 61-67 may be designated as corresponding to different classes, so that different ones of the data devices 61-67 correspond to different physical storage having different relative access speeds or RAID protection type (or some other relevant distinguishing characteristic or combination of characteristics), as further discussed elsewhere herein.

As discussed elsewhere herein, the data devices 61-67 (such as LVs or other logical devices) may be associated with physical storage areas (e.g., disk drives, tapes, solid state storage, etc.) having different characteristics. In various embodiments, the physical storage areas may include multiple tiers of storage in which each tier may include disk drives having different characteristics such as speed, technology and/or cost. The devices 61-67 may appear to a host coupled to the storage device 24 as a logical volume (logical device) containing a contiguous block of data storage. In some embodiments, storage of a single data device, such as a single logical device, may be provisioned from a single storage tier. As a variation, some embodiments may provision storage for a single such device from multiple different storage tiers. Accordingly, each of the devices 61-67 may map to storage areas across multiple physical storage drives of one or more of the storage tiers depending on the particular embodiment.

Figure 6:
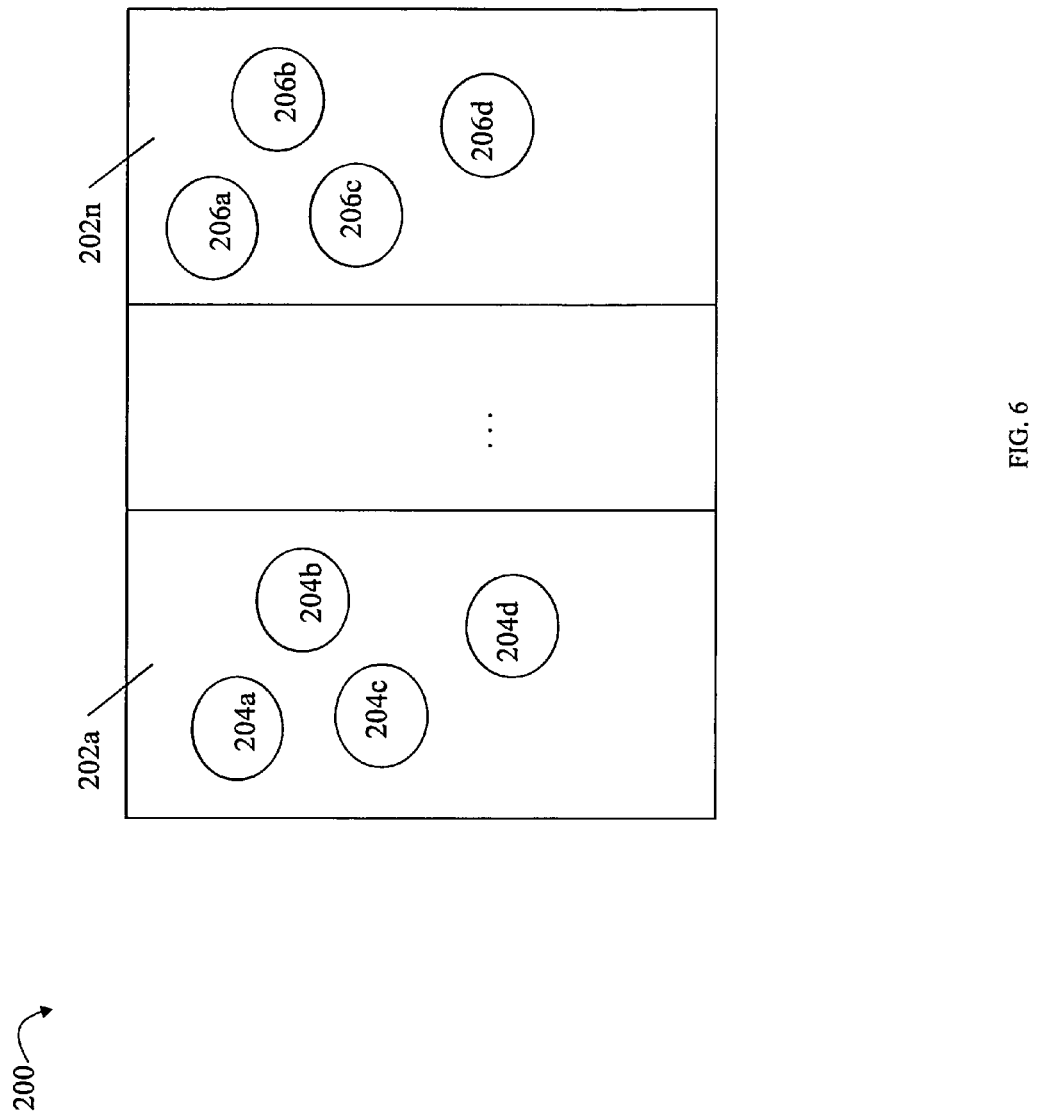
FIG. 6 is an example illustrating objects that may be assigned to virtual partitions in an embodiment in accordance with techniques herein.

Referring to FIG. 6, shown is an example illustrating virtual partitions for a single data storage system. The example 200 includes virtual partitions 202a-202n (n representing any number of virtual partitions that may be used in a particular embodiment), each of which are assigned various objects. For example, partition 202a may be assigned various objects 204a-204d and partition 202n may be assigned various objects 206a-206d. Each of the objects 204a-204d, 206a-206c may represent a data storage system resource or a client or consumer of a data storage system resource. For example, an object assigned to a virtual partition, where the object is a data storage system resource may represent a portion of data storage. For example, an object may represent a logical device such as an LV, a defined storage group of one or more logical devices, a physical device, a defined storage pool of one or more physical devices, or a portion of any of the foregoing. An object assigned to a virtual partition may represent other data storage system resources (or portions thereof) besides storage devices such as, for example, a portion of memory, a portion of cache, an amount of CPU utilization, an amount of DA or FA utilization, and the like. An object assigned to a virtual partition may represent a data storage system client or consumer of data storage system resources. For example, an object may represent a host and its associated application(s) that store and access data stored on devices of the data storage system, use data storage along with other data storage system resources (e.g., CPU, memory, cache, and the like) in performing a data storage system service such as a performing a backup, making a copy or clone of a data set, and the like.

It should be noted that not all resources which are represented as objects may be exposed or otherwise made visible to an administrator (e.g., such as an administrator of a virtual partition) for purposes of administration and management in an embodiment. For example, an embodiment may choose not to have CPU, cache, memory, and possibly other data storage system resources represented as objects and not exposed to the administrators. The particular objects and associated resources which are made visible to a data storage administrator may vary with embodiment.

Each of the virtual partitions may be independently and individually managed. In other words, objects of virtual partition 202a are managed independently from objects of virtual partition 202n. Each partition may have its own set of one or more administrators or users having different assigned roles. The scope of objects to which each administrator is exposed in terms of viewing, accessing and generally performing any operations in accordance with an assigned role is based on the objects of the partition to which the administrator is assigned. For example, a first administrator may be assigned to partition 202a and may have access to only those objects 204a-204d assigned to partition 202a. The first administrator assigned to 202a does not have access to objects 206a-206n assigned to partition 202n. Thus, a virtual partition having objects assigned to or included therein provides a management access control boundary thereby allowing virtually partitioned data storage system resources to be independently controlled, managed and allocated for use by consumers assigned to each such virtual partition.

An administrator may be a user of the data storage system that performs any one or more different data storage system management tasks such as, for example, provisions storage for use by different clients, performs data protection services and operations, and the like. An administrator may be assigned one or more different roles, each such role specifying what operations an administrator is allowed to perform and/or disallowed from performing. For example, in one embodiment, an administrator having an account as a user of data management software for management of the data storage system may have a role of manager, monitor or replication/replicator. The manager role may allow the administrator to generally perform any and all operations possible in connection with data storage system management with respect to a partition to which the administrator-manager is assigned. For example, the manager of a partition is allowed to provision storage from a storage pool assigned to the partition in order to create new logical devices for the partition, is allowed to create and define storage groups for the partition from logical devices of the partition, and is allowed to assign a data storage client of the partition to a first storage group of logical devices thereby allowing the data storage client to perform data storage operations to store and retrieve data from the first storage group. The role of monitor may be characterized as allowing operations which are read-only with respect to a partition to which the administrator-monitor is assigned. For example, the monitor role allows and administrator of a partition is to only view information regarding assigned objects of the partition and he/she is not allowed to perform other operations which modify, create or define new objects of the partition. The role of replicator may be characterized as allowing an administrator of a partition to only perform replication operations on assigned data storage of the partition for the purpose of performing data protection services. For example, an administrator-replicator may be allowed to perform operations necessary to backup a data set, create a snapshot or clone of a device, and the like.

Objects assigned to a virtual partition which represent data storage system resources may be assigned for exclusive use by the virtual partition and may therefore not be accessed or otherwise utilized by any other virtual partition. As a variation, an object representing a resource may also be assigned to a selected set of one or more virtual partitions thereby providing access and utilization of the represented resources to the selected virtual partitions. In a similar manner, an object assigned to a virtual partition where the object represents a consumer or client of data storage system resources may be assigned exclusively to only a single virtual partition, or may otherwise be assigned to a selected set of one or more virtual partitions. In such an instance where the same consumer or client is assigned to multiple different virtual partitions, the client or consumer may be bound by the policies of each virtual partition when using resources of each such respective virtual partition.

Figure 7:
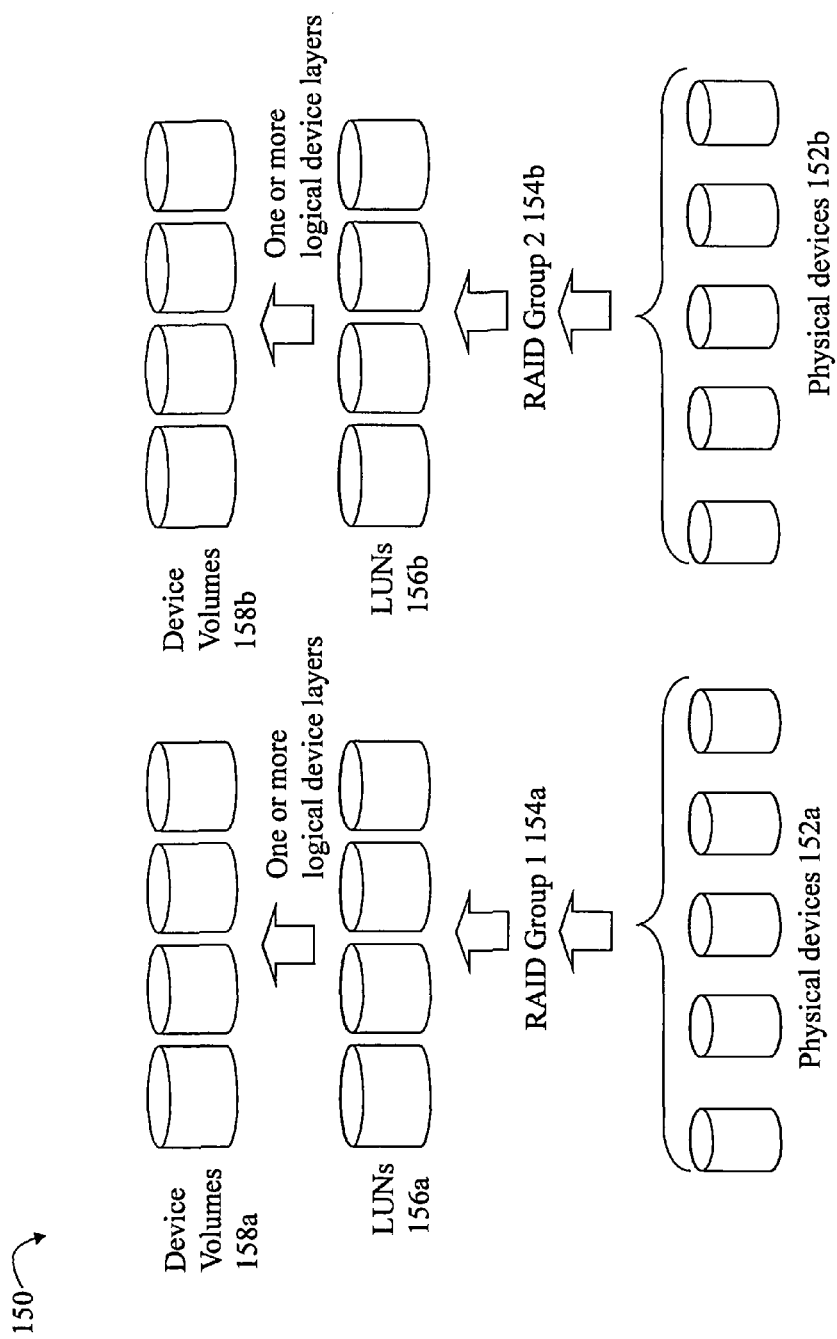
FIG. 7 is an example illustrating different data storage resources of a data storage system in an embodiment in accordance with techniques herein.

Referring to FIG. 7, shown is an example representing how logical devices may be formed in an embodiment in accordance with techniques herein in a data storage system. The example 150 illustrates that, as a first step, one or more RAID groups may be formed from physical devices of the data storage system. For example, RAID Group1 154a may be formed from physical devices 152a and RAID Group 2 154b may be formed from physical devices 152b depending on the desired RAID level and configuration. For example, for physical devices 152a on a data storage system, RAID-5 may be used in a 4+1 configuration (e.g., 4 data drives and 1 parity drive). Subsequently one or more LUNs (logical unit numbers) 156a, 156b may be formed, respectively, from each of the RAID groups 154a, 154b. An embodiment may also optionally utilize one or more additional logical device layers on top of the LUNs 156a, 156b to form one or more logical device volumes 158a. The particular additional logical device layers used, if any, may vary with the data storage system. It should be noted that there may or may not be a 1-1 correspondence between the LUNs of 156a and the volumes of 158a depending on whether such additional logical device layers are utilized. In a similar manner, device volumes 158b may be formed or configured from physical devices 152b. A storage group SG may be a defined logical grouping of one or more LUNs or one more logical devices or volumes. A storage pool may be defined as including one or more RAID groups corresponding to a lower level in the storage allocation hierarchy generally represented in FIG. 7. Thus, one or more LUNs may be formed from a storage pool. The LVs or data devices described elsewhere herein may correspond to the device volumes 158a, 158b of FIG. 7.

The foregoing example 150 is only one way in which storage may be defined and provisioned in an embodiment in accordance with techniques herein. In such an embodiment, objects which are assigned to a virtual partition and which represent portions of data storage may correspond to any of the above-mentioned entities (e.g., physical device, RAID group, storage pool, storage group, LUN, LV, and portions and multiple sets thereof).

A virtual partition may be assigned an access control policy that specifies what objects are assigned to a partition such as described above and elsewhere herein. For example, an access control policy of a virtual partition may assign a portion of data storage of the data storage system as a resource for exclusive use and access by consumers and administrators of the virtual partition. For example, as described above in connection with FIG. 6, the access control policy for partition 202a may identify one or more objects 204a-204d representing storage devices of the data storage system for exclusive access and use in virtual partition 202a. In accordance with one aspect, the virtual partition including a set of one or more objects (where such objects are not included in any other partition) may be characterized as providing a management access control boundary to the set of objects whereby administrators assigned to the virtual partition are allowed to access and perform particular operations with respect to the set of objects depending on administrator role, and whereby administrators assigned to other virtual partitions are not allowed access or otherwise perform any operation on such objects included only in the virtual partition. It should be noted that an access control policy may also specify other aspects of access control. For example, a partition administrator, such as a manager, may further restrict or limit access of another administrator having another role such as monitor or replicate, to a subset of a partition's objects representing a subset of partition resources and/or a subset of a partition's consumers or clients.

Furthermore, assignments (also referred to as associations or relationships) may be defined between pairs of objects in a partition further specifying details of an access control policy for a virtual partition. The particular relationship or association between pairs of objects may vary with the objects. In one embodiment, an association between a consumer object and a resource object may denote that the consumer may use or consume the resource subject to any other policies of the virtual partition (e.g., such as a performance policy). As another example, there may be an association between two resource objects to represent that one of the objects is created from or using another resource object. For example, with reference to FIG. 7, a LUN (first object) may be provisioned (e.g., provisioning being the association represented) from a storage pool (second object) and a storage group (first object) may be defined which includes one or more LUNs or other logical devices (each LUN or logical device represented as an object that is associated with/included in the storage group object). The foregoing may be represented using objects and associations between such objects. There may be other resources, such as CPU, memory and cache, that may be associated with each consumer in the virtual partition representing the fact that such resources are available for use by each client or consumer in the partition subject to any other policies of the virtual partition including the consumer or client.

Following are more detailed examples of virtual partition administration for a data storage system, such as a data storage array, as may be performed in an embodiment in accordance with techniques herein.

Figure 8:
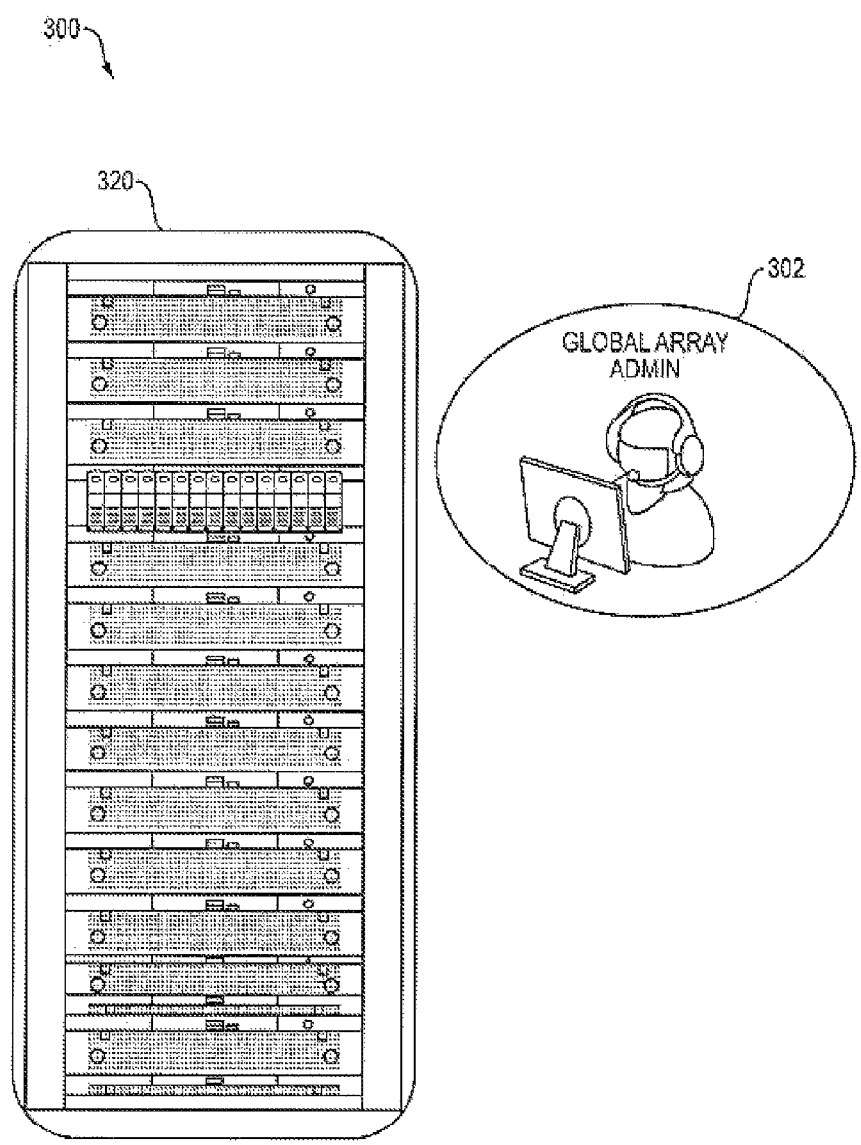
FIGS. 8, 9A-9B, 10A-10B, 11A-11B, 12A-12B, 13A-13B, and 14A-14B are examples illustrating creation and management of virtual partitions and illustrating aspects of access control policies for the virtual partitions in an embodiment in accordance with techniques herein.

Referring to FIG. 8, shown is an example 300 of a data storage array 320 having a global array administrator or global administrator 302. The global administrator 302 may be responsible for management of the entire storage array and may have an assigned role of manager. Generally, global administrator 302 may create one or more virtual partitions and associated virtual partition policies as described herein.

Figure 9B:
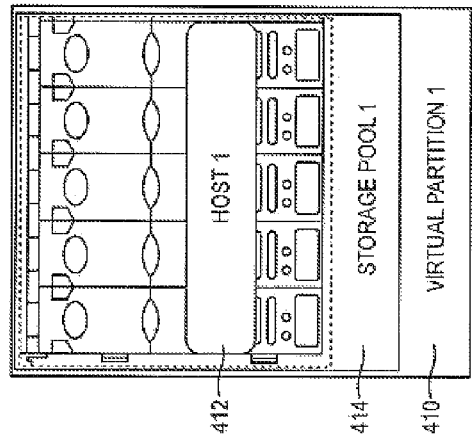
Figure 9A:
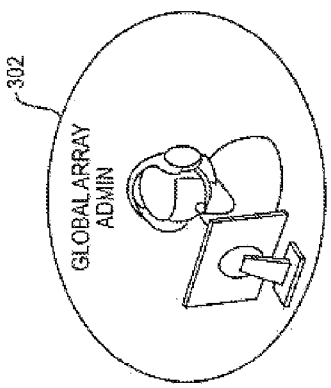
Figure 9A:
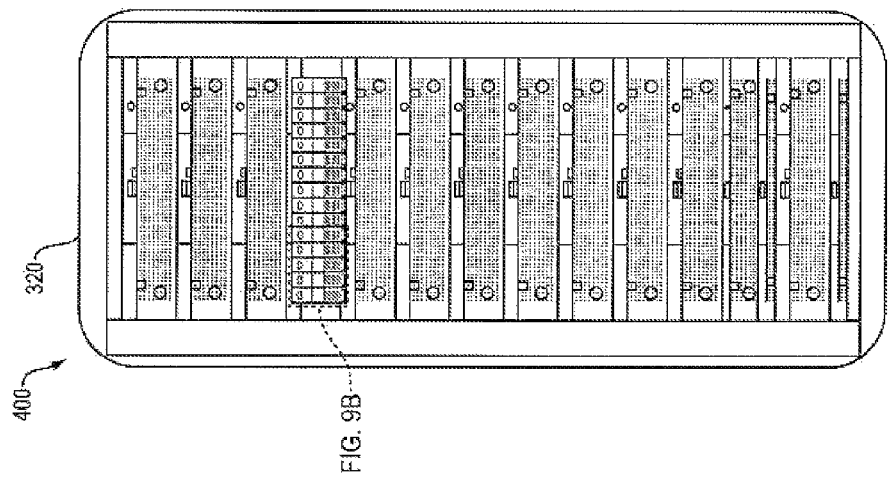

With reference to FIGS. 9A and 9B, as a first step, the global administrator 302 may create virtual partition 1 410 and assigns storage pool 1 414 and host1 412 to partition 1 410. Both 412 and 414 may be represented as objects assigned to partition 1 410 where 412 is a data storage system resource and 414 is a data storage system consumer or client.

Figure 10A:
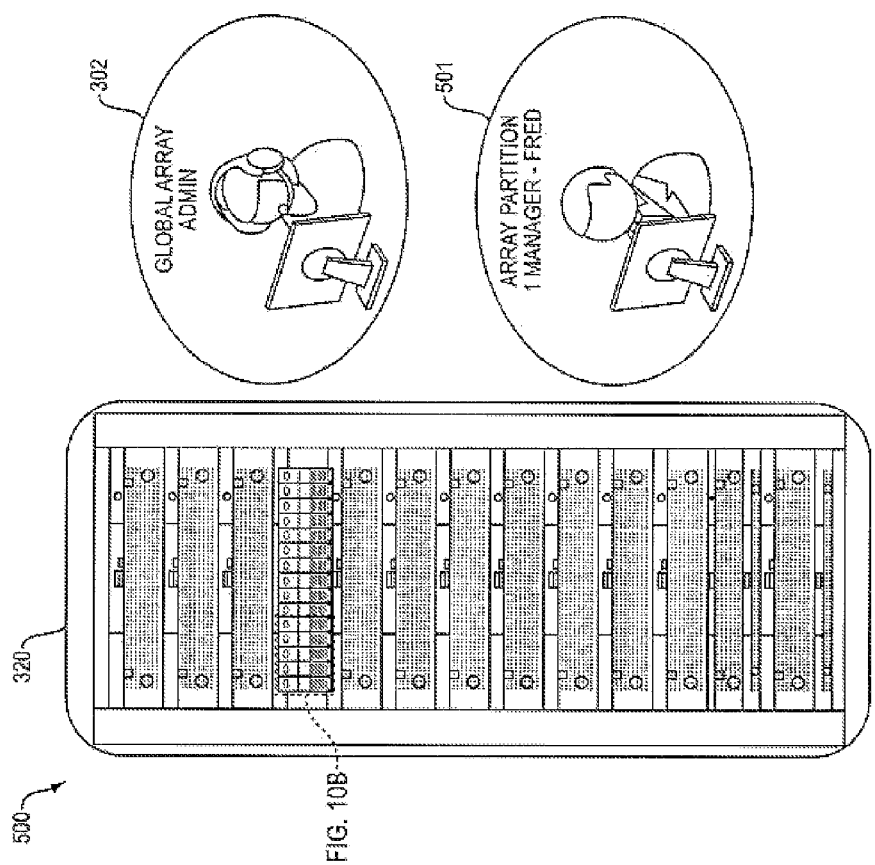
Figure 10B:
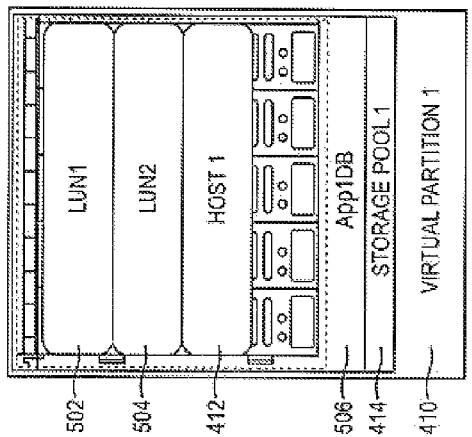

Additionally, now with reference to FIGS. 10A and 10B, the global administrator creates a new user Fred 501 who is an administrator having a manager role. Fred 501 is assigned as an administrator-manager of virtual partition 1 410. In connection with the foregoing Fred 501 may see and view only objects and associated entities assigned to the partition 1 410 (e.g., objects for host 1 412 and storage pool 1 414) even though there may be other resources and clients or consumers of the array 320. As virtual partition manager for partition 1 410, Fred 501 now provisions storage for LUNs 502 and 504 from Storage pool 1 414, creates a storage group (SG) "App1DB" 506, and then assigns the two LUNs 502 and 504 to the SG 506. Fred 501 assigns host 1 412 to the SG 506. Thus, Fred 501, in accordance with his permissible operations based on his manager role, has further defined assignments, associations, or relationships between objects of partition 1 410 further specifying details of an access control policy for partition 1. Fred 502 has also created new additional objects assigned to the partition 1 410.

In accordance with one embodiment's access control policy, the global administrator 302 may not be able to perform certain operations on objects created by the virtual partition manager Fred 501. For example, an embodiment may allow the global administrator to only "monitor" objects and relationships which the global administrator did not create or define. For example, the global administrator 302 may be able to view the objects created by Fred representing 501, 504 and 506 but may not be able to modify or perform other operations that change or destroy such objects or relationships between the objects 502, 504, and 506 that Fred 501 has defined. This may be to avoid having the global array administrator 302 intervene or interrupt virtual partition management in progress by Fred 501.

Figure 11A:
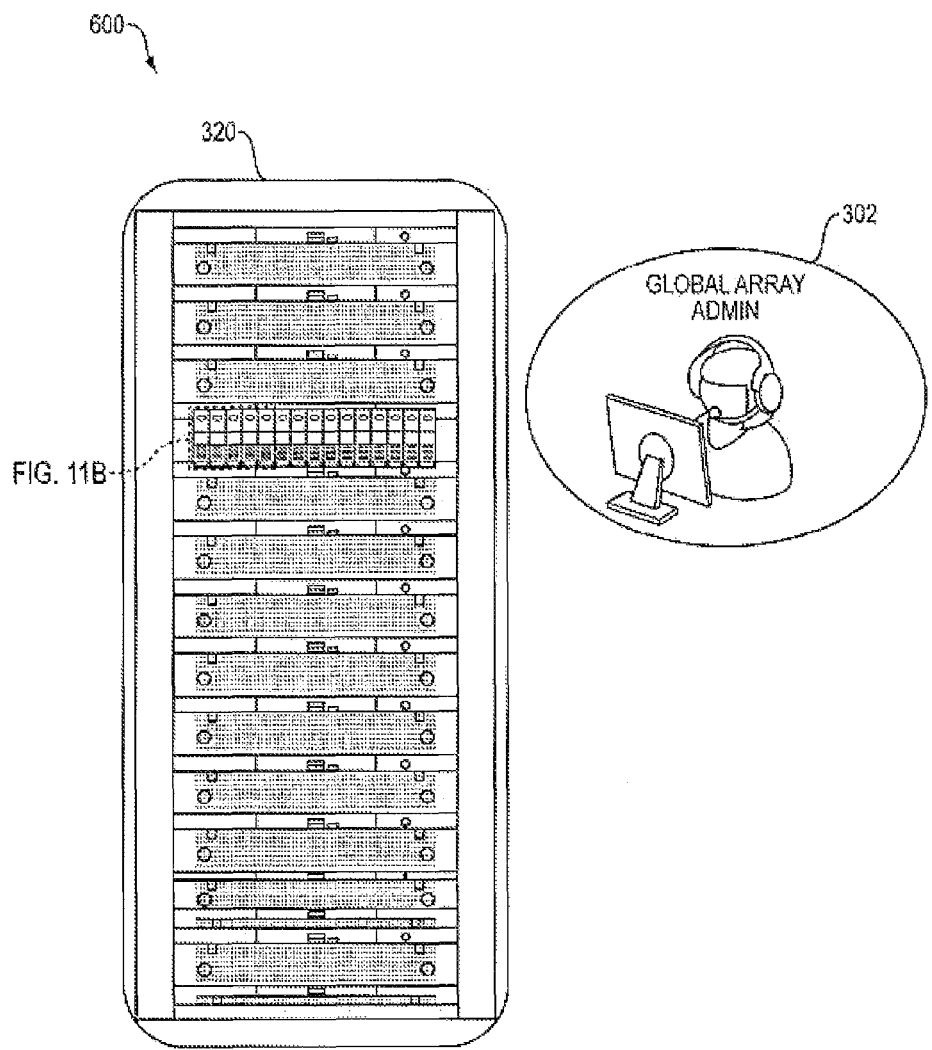
Figure 11B:
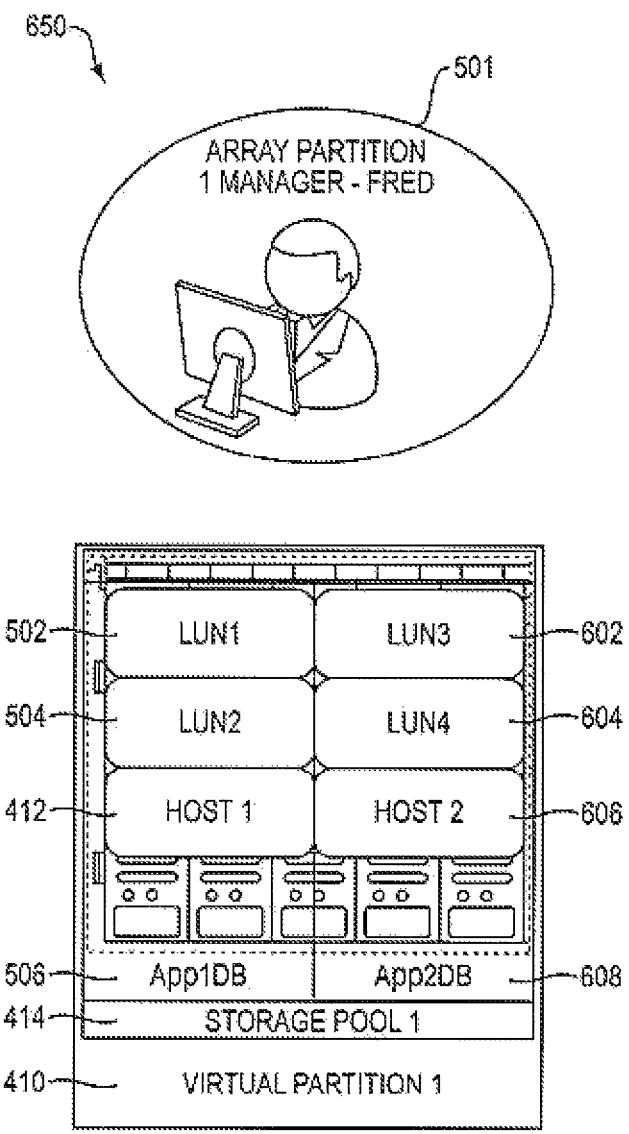

With reference to FIGS. 11A and 11B, the global administrator may create another object for host 2 606 and assign host 2 606 to virtual partition 1 410. In response. Fred 501 may create LUNs 602, 604 by provisioning storage from storage pool 414 and then add objects for 602, 604 to virtual partition 1 410. Fred 501 creates another SG "App2DB" 608 and associates 608 with host 2 606 thereby indicating that host 2 606 may consume, use or access storage of 608. It should be noted that host 2 606 is assigned SG 608 (and not SG 506 or other storage device resources) and host 1 is assigned SG 506 (and not SG 508 or other storage device resources) representing the access restriction that host 2 can only access SG 608 and host 1 can only access 506.

Figure 12A:
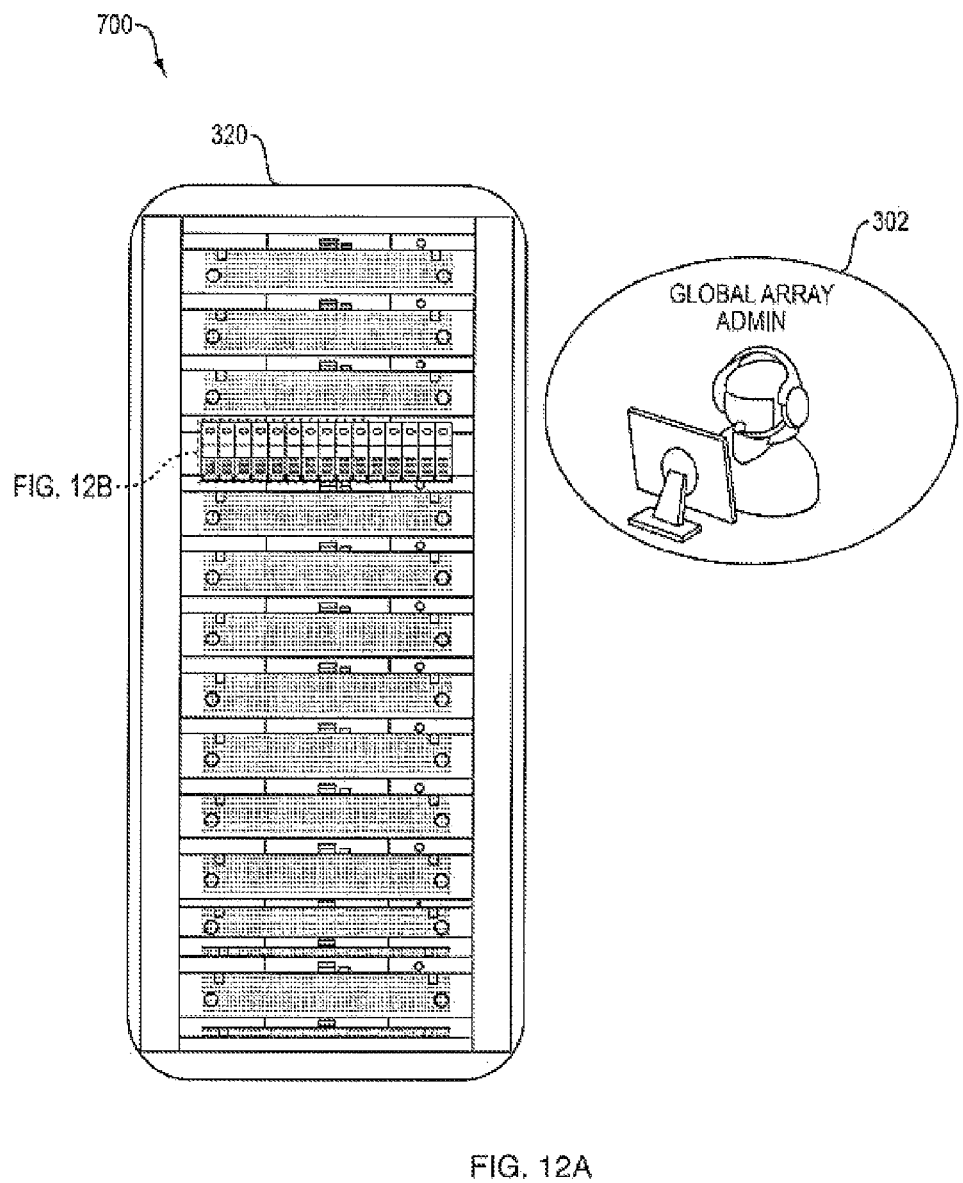
Figure 12B:
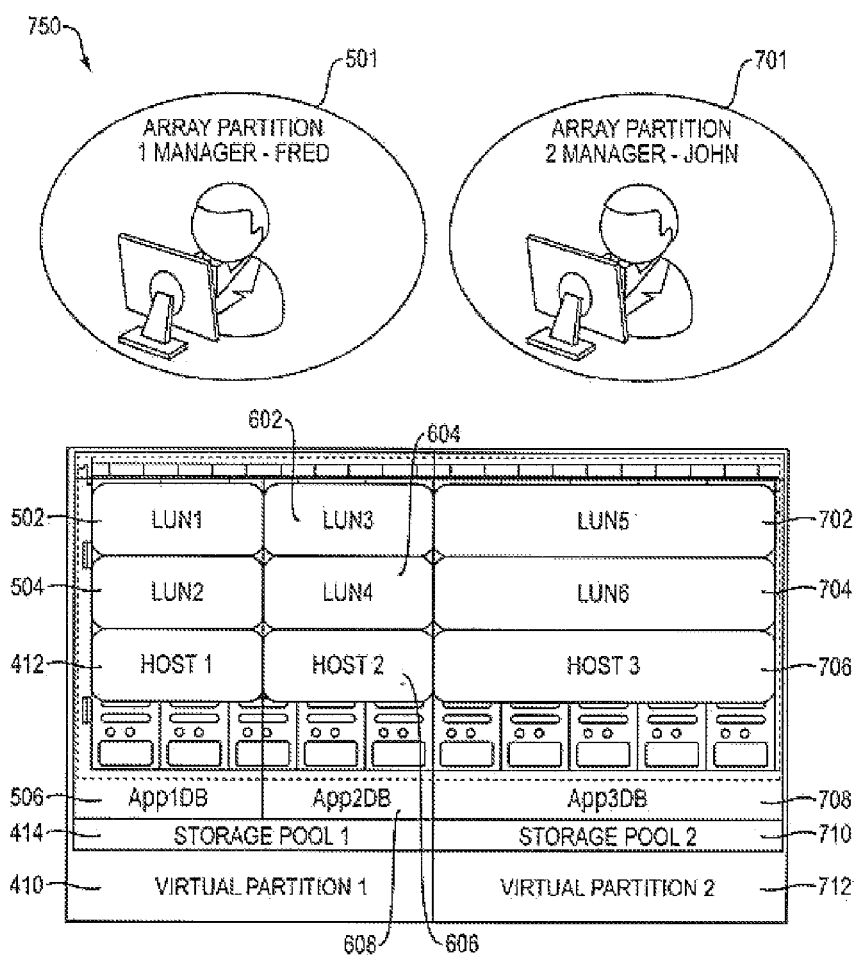

With reference to FIGS. 12A and 12B, the global administrator 302 creates a new virtual partition 2 712 and creates and assigns and object for host 3 706 and storage pool 2 710 to the virtual partition 712. John 701 is designated as the virtual partition manager for virtual partition 712 and creates LUNs 702, 704 by provisioning storage from storage pool 710. John 701 defines SG "App3DB" 708 and associates 708 with host 3 706. In a manner similar to as described above, host 3 706 has access only to SG 708 and not either of 506 or 608 in this example.

Figure 13A:
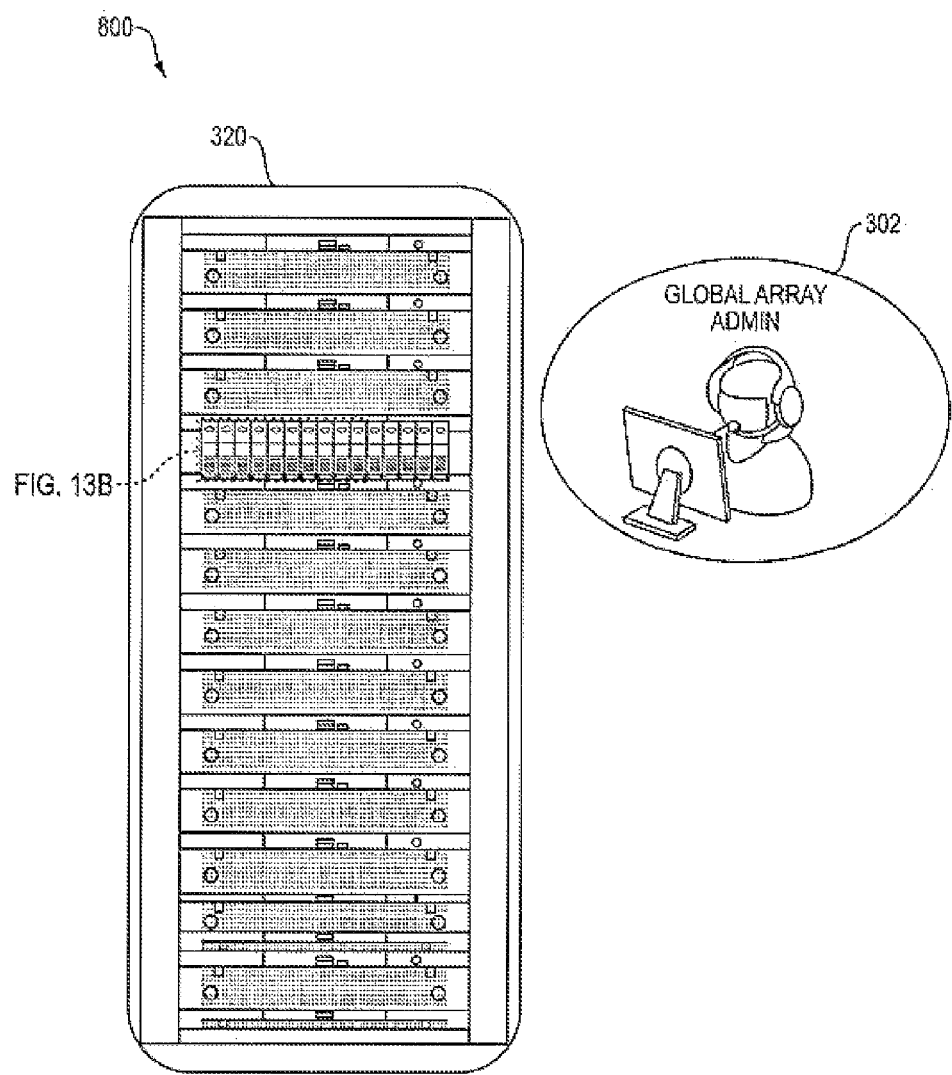
Figure 13B:
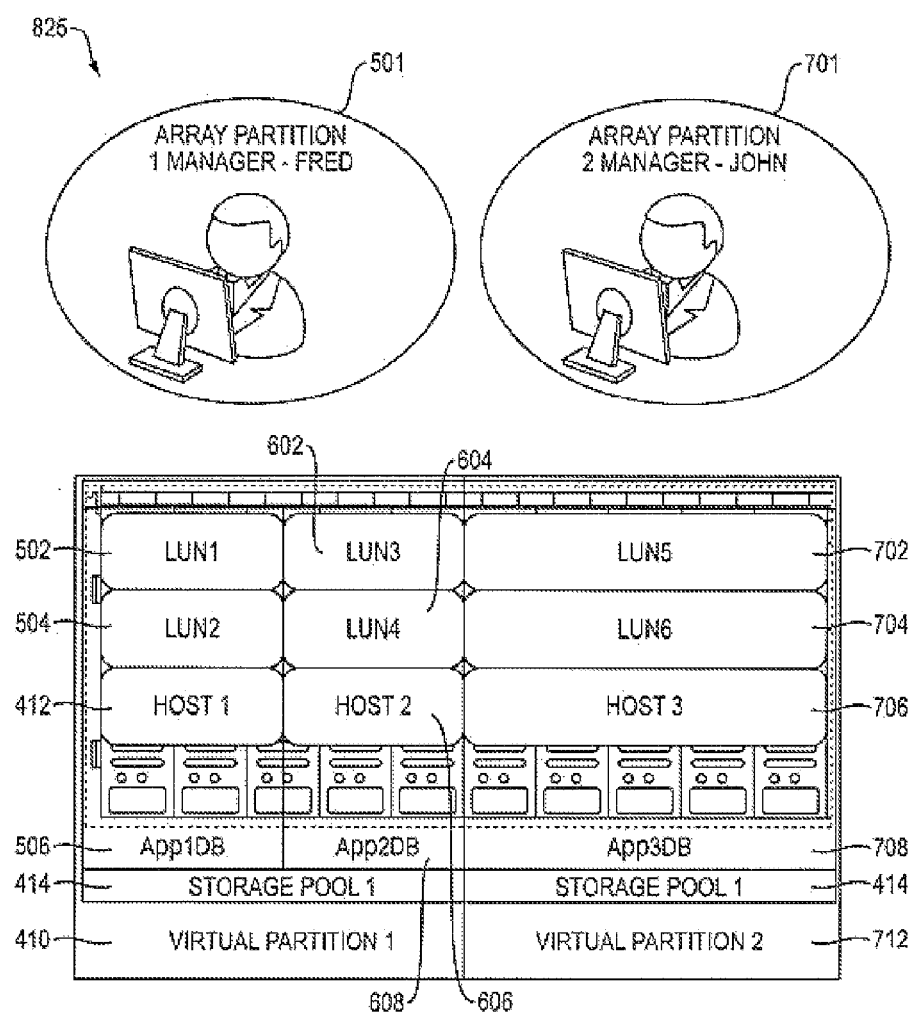

With reference to FIGS. 13A and 13B, shown is an alternative varying that which is described in FIGS. 12A and 12B. FIGS. 13A and 13B are the same as in FIGS. 12A and 12B with the difference that the storage pool 1 414 is shared by both partitions 410 and 712. Accordingly, both virtual partitions 410 and 712 may provision storage from the shared storage pool 414. However, in accordance with the access control policy, objects further created from the pool 414 such as for each of LUNs 502, 504, 602, 604, 702 and 704 and may be designated as LUNs for exclusive use within an assigned single partition. As such, each of the virtual partition managers 501, 701 may be able to view certain information about the shared pool 414 such as available storage for provisioning, underlying RAID group configuration, physical device information and characteristics, and the like, but virtual partition managers 501, 701 may only access, view and manage LUNs assigned to their respective partitions.

Figure 14A:
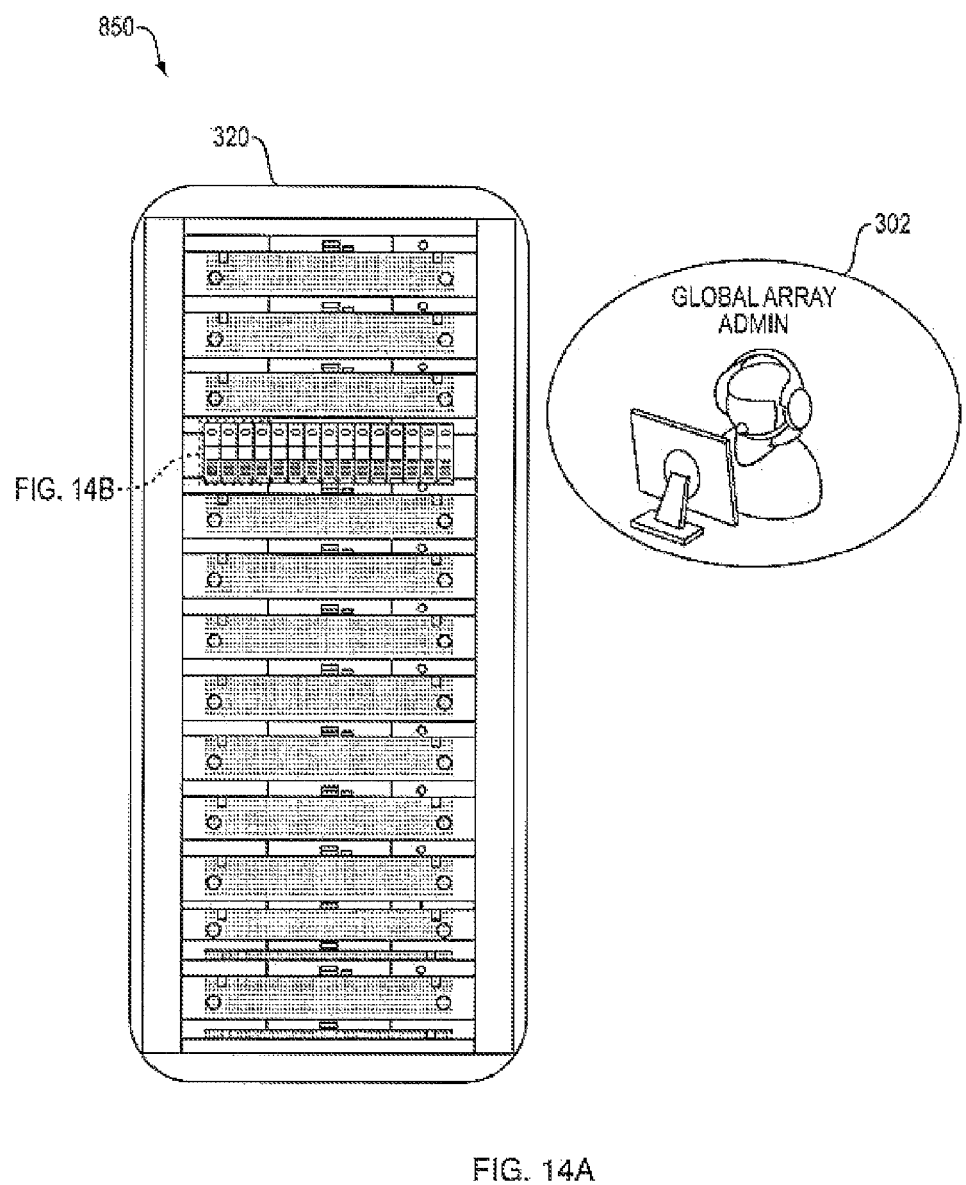
Figure 14B:
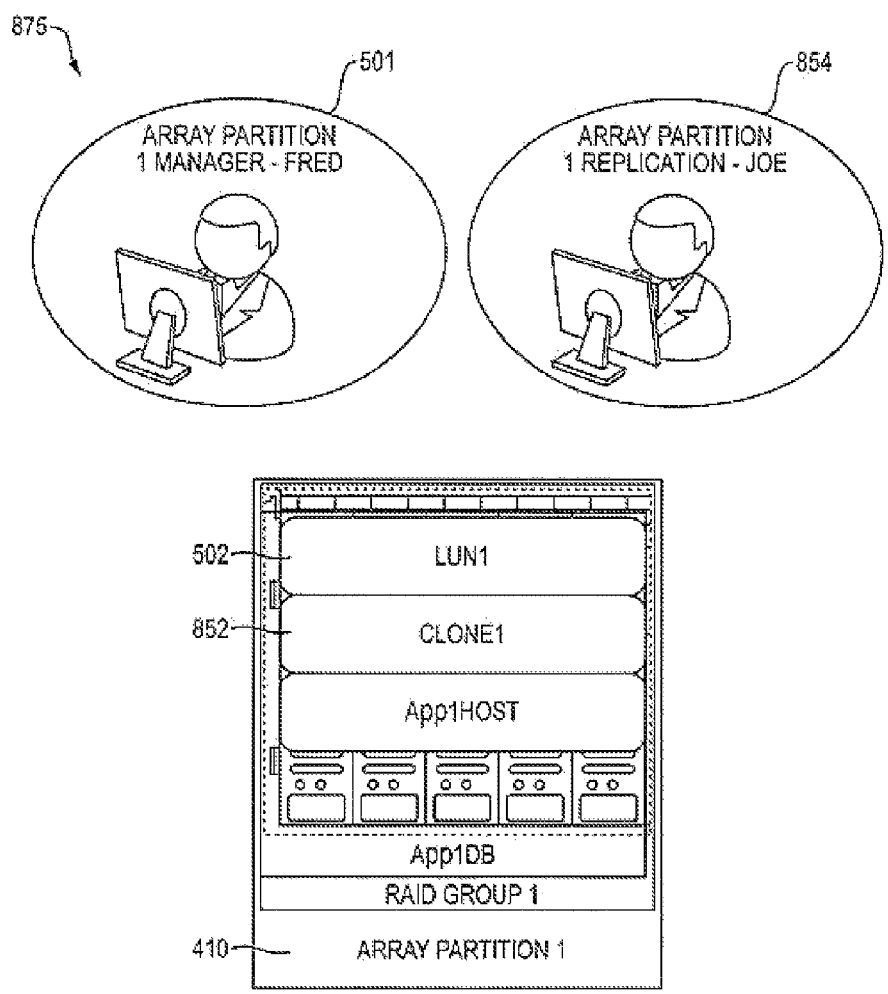

With reference to FIGS. 14A and 14B, assume that Fred 501 is manager of partition 410 as defined in connection with FIGS. 10A and 10B. Subsequently, assume Fred 501 creates a new user Joe 854 who is assigned as an administrator to partition 410 and has a role of replication. Thus, Joe 854 is allowed, for example, to create clone 852 as a copy of LUN1 502. However, Joe is not able to perform non-replication related operations.

Based on the foregoing, an access control policy for virtual partitions may provide an access control boundary for administrative purposes amongst the different virtual partitions of the array. However, with just an access control policy, a consumer or client of a single partition may still monopolize or otherwise consume an undesirable amount of other data storage system resources. As such, an embodiment may also define one or more other policies including a performance policy and/or a data storage allocation policy for each of the virtual partitions. In an embodiment of a data storage system which includes multiple storage performance tiers as described elsewhere herein, the storage allocation policy may specify upper bounds or thresholds indicating a limit of an amount of each storage tier that may be consumed by a virtual partition. The performance policy may specify similar limits or bounds with respect to one or more performance metrics and/or one or more other resources of the data storage system. In some embodiments, the resources of the performance policy may be varied in connection with controlling or regulating observed or measured values of the one or more performance metrics (e.g., response time, I/O throughput, bandwidth, and the like). As described in more detail elsewhere herein, measured or observed performance metric values may vary in accordance with thresholds for the one or more resources that may be specified in the performance policy as well as other data storage system resources. As such, an embodiment may select the thresholds of the one or more resources of the performance policy and/or other resources based on thresholds specified for performance metric values.

Furthermore, as described elsewhere herein, an embodiment may vary the amount of one or more data storage system resources as a means by which to control or regulate an observed performance metric value in order to obtain or keep within a desired performance metric threshold.

As described in more detail below, an allocation and/or performance policy may be specified for each virtual partition.

Figure 15:
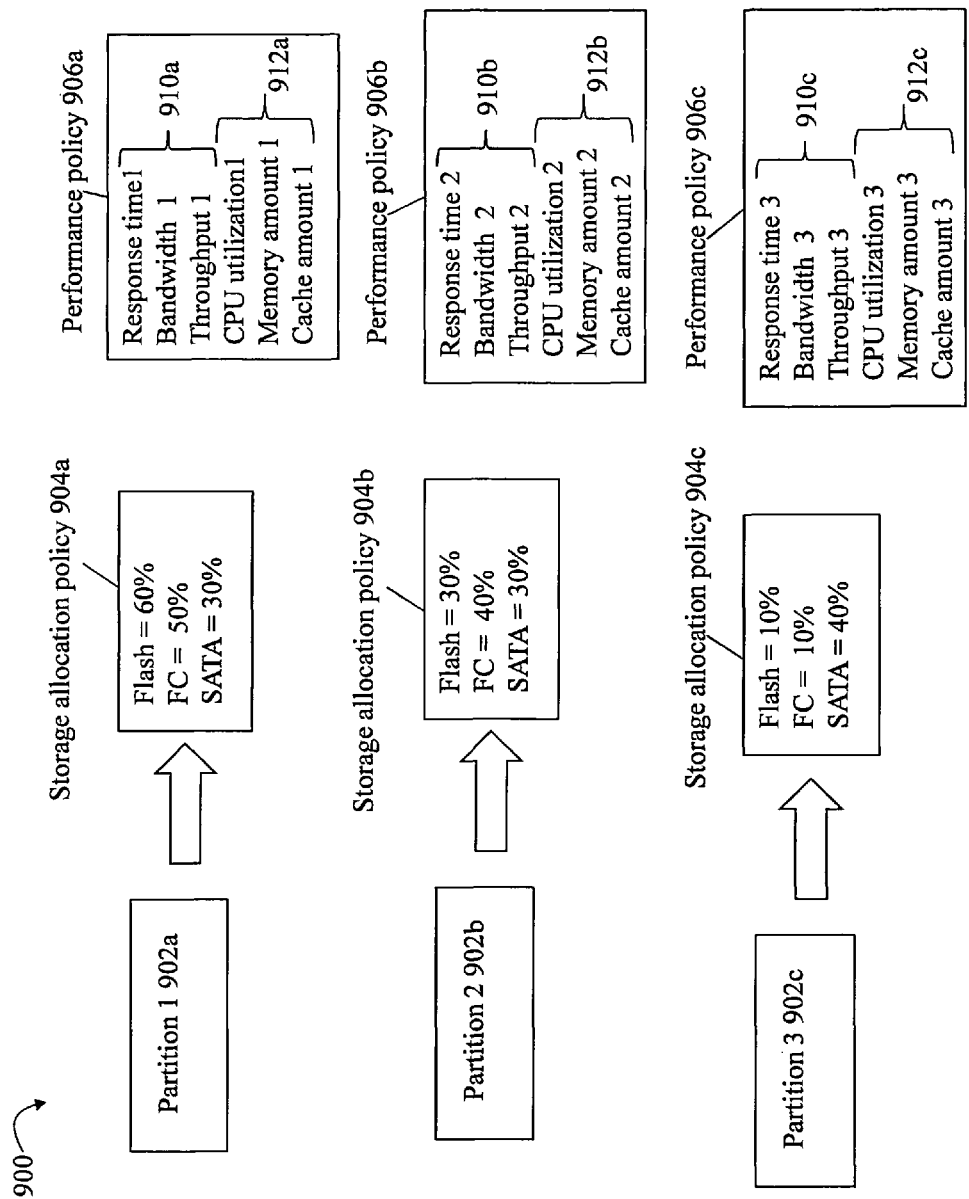
FIGS. 15 and 16 are an examples illustrating policies that may be assigned to virtual partitions of data storage system in an embodiment in accordance with techniques herein.

Referring to FIG. 15, shown is an example representation of storage allocation and performance policies that may be defined for use with virtual partitions in an embodiment in accordance with techniques herein. In this example, there may be three virtual partitions 902a-902c defined for a data storage system. The data storage system may have 3 storage tiers including a first tier of flash drives or devices (Flash tier), a second tier of FC rotating disk drives (FC tier) and a third tier of SATA rotating disk drives (SATA tier). Flash may be the highest performing tier, FC the second highest performing tier and SATA the lowest performing storage tier. Each of the virtual partition 902a-c may have a defined access control policy specifying objects and relationships or associations between objects, as described above, where the objects may include resources and resource consumers. The example 900 illustrates 3 virtual partitions 902a-c which are each additionally assigned, respectively, the storage allocation policies 904a-904c and the performance policies 906a-906c. Each of the storage allocation policies 904a-c may specify an upper limit or threshold for one or more of the storage tiers. In the example 900, the storage allocation policies 904a-c represent the storage tier limits in terms of percentages of total storage tier user data storage capacity. Based on storage allocation policy 904a, virtual partition 904a may use up to 60% of all of the flash storage on the data storage system, up to 50% of the FC storage tier, and up to 30% of the SATA storage tier. Based on storage allocation policy 904b, virtual partition 904b may use up to 30% of all of the flash storage on the data storage system, up to 40% of the FC tier storage, and up to 30% of the SATA storage tier. Based on storage allocation policy 904c, virtual partition 904c may use up to 10% of all of the flash storage on the data storage system, may use up to 10% of the FC storage and up to 40% of the SATA storage tier. Based on 904a-904c, virtual partition 902a is allowed to use the largest amount (60%) of the highest performing storage tier (the flash tier) in comparison to the other partitions 902b and 902c. It should be noted that an embodiment may use other suitable ways to express or represent storage tier thresholds such as, for example, raw or absolute storage quantities (e.g., such as in terms of gigabytes (GBs), megabytes (MBs), and the like). In one embodiment, the sum of percentages for a single storage tier may total 100% or the total amount of user data storage capacity in the single tier on the data storage system.

Besides specifying an upper limit threshold for each storage tier, an embodiment may allow for specifying both a minimum threshold or limit (lower bound) and a maximum threshold or limit (upper bound). In such an embodiment, the minimum amount of each storage tier may always be available or reserved for use by the associated partition. For a storage tier, a partition may use up to the maximum amount indicated by the corresponding maximum threshold if available. In such an embodiment, for a single storage tier, the sum of the lower bound thresholds across all virtual partitions should not exceed the total storage capacity for a storage tier. With respect to the upper bounds or thresholds, no single upper bound may exceed the 100% representing the total user storage capacity although the sum of amounts or percentages specified as maximum thresholds across a single tier may exceed 100%. Other embodiments may, of course, specify values for such thresholds than as illustrated for purposes of example.

In a manner similar to that as described herein for thresholds of the storage allocation policies 904a-904c, performance policies 906a-906c may specify one or more threshold values for each of one or more performance metrics and/or one or more other data storage system resources (e.g., may specify upper limit only, or may specify upper and lower limit). In this example, the performance metrics of performance policies 906a-906c may include response time, bandwidth, and throughput as represented, respectively, by 910a-910c. In this example, the performance-related data storage system resources of performance policies 906a-906c may include CPU utilization, an amount of memory or memory utilization, and an amount of cache or cache utilization as represented, respectively, by 912a-912c.

In one embodiment, the particular values selected for thresholds in the performance policy for a virtual partition may be determined based on a defined quality of service (QOS) level for the virtual partition. For example, partition 902a may have the highest relative QOS level of all three partitions 902a-c, partition 902b may have the second relative QOS level of all three partitions 902a-c, and partition 902c may have the lowest relative QOS level of all three partitions 902a-c. The foregoing relative QOS level may be a further attribute of the performance policy for each virtual partition. Furthermore, a QOS level associated with a partition may be one of a plurality of predefined QOS levels where each such QOS level has an associated predefined QOS template specifying a combination of different policy limits or thresholds with respect to resource consumption. Such QOS templates may be defined based on a modeled set of assumptions or parameters such as, for example, a particular data storage configuration (e.g., number of DAs servicing a certain number of physical devices of a particular storage tier), a particular workload as may be determined using one or more performance metrics (e.g., average response time, bandwidth, throughput), and the like. The defined thresholds in a QOS template may indicate, for example, a certain amount of each resource (e.g., cache, memory, CPU) of the performance policy to use as the lower and/or upper thresholds in order to obtain particular values of performance metrics (e.g., response time, throughput, and the like) for a given data storage configuration based on an assumed workload (e.g., incoming rate of I/Os for particular devices (number of reads and/or writes per unit of time), incoming I/Os of a certain size, and the like). Thus the QOS template may provide a default set of thresholds for resources and/or performance metrics of a performance policy whereby such default values are assigned to a performance policy based on the selected QOS level. A virtual partition manager, for example, may be allowed to change these values or use those of the predefined QOS template. Such templates may be customized for particular host applications (e.g., database application, email application) having particular execution profiles. For example, an execution profile for an application may identify with the application performs large sequential read operations, an expected ratio of read and write operations, and the like, that may affect the particular amount of each resource and/or threshold included in the QOS template. QOS templates as described above may be based using any suitable technique such as modeling based on a set of assumed conditions or parameters as described above.

It should be noted that the above-mentioned QOS templates may specify thresholds for use with other resources of the data storage system besides those noted above. The QOS templates may specify, for example, thresholds related to memory consumption, CPU utilization as noted above and also, for example, DA and/or FA utilization. The thresholds of the performance policy may apply to the total amount of resources for an assigned virtual partition so that such that are applied to the total amount of resources that all consumers in the partition may collectively use at a point in time.

In connection with both the storage allocation and performance policies, the virtual partition manager may further specify other resource and performance limits for use by a particular consumer, or more generally, any consumer of the virtual partition. For example, with reference back to FIGS. 13A and 13B, Fred may specify a consumer-level performance policy and/or a consumer-level allocation policy so that no single client assigned to the partition may consume more than a threshold amount of one or more resources (e.g., where the resource may be an amount of storage of one or more tiers, may be an amount of a resource in the performance policy) and/or may keep within one or more thresholds of one or more performance metrics. Additionally, Fred may specify a first consumer-level performance policy customized for host 1 412 and a second consumer-level performance policy customized for host 2 606 such as, for example, depending on the particular application(s) executing on each such host. Thus, such consumer-level policies provide the partition manager with the ability to further manage resources of the virtual partition subject to any partition level policies.

Generally, the performance policy assigns one or more performance limits (in terms of values for performance metrics and/or performance-related data storage system resources) for controlling use of data storage system resources by consumers of one of the plurality of virtual partitions that is assigned the performance policy. The use of QOS levels and associated templates may provide for specifying a performance policy in a simplified abstract manner by selecting a particular defined QOS level. Selection of a QOS level and associated template for a virtual partition may provide for automatically specifying default performance policy limits or thresholds such as specifying a default value for one or more performance metrics such as bandwidth, I/O throughput, and response time, specifying a threshold for use of a single data storage system resource such as CPU utilization, memory utilization or amount of memory allocation, cache utilization or an amount of cache allocation, and the like. Response time may be an average time for an I/O request for the virtual partition to be serviced by the data storage system including any wait time, bandwidth is an average amount of data in connection with read and/or write I/O requests for the virtual partition processed by the data storage system per unit of time, and throughput is an average number of I/O requests for the virtual partition serviced by the data storage system per unit of time. Each consumer assigned to a virtual partition inherits or is bound by the virtual partition's set of one or more policies. For each resource and each performance metric in a performance policy, a single threshold may be specified that is an upper bound or limit, or multiple thresholds may be specified (e.g., such as a minimum and maximum) as may be suitable or desirable based on the particular resource and metric.

In connection with the thresholds specified in performance and/or allocation policies, such thresholds may be enforced as a hard limit (e.g., always enforced at each point in time), or may be determined as an average value with respect to a time period. If, for example, both a minimum threshold and maximum threshold are specified for a resource in a virtual partition performance policy, the minimum threshold amount may always be available for use by the virtual partition with additional amounts allocated up the maximum threshold.

The policies for a virtual partition, in particular the performance policy, may be enforced in a variety of different ways depending on the resource. For example, the performance policy thresholds may be compared to average observed, estimated, or modeled values for a virtual partition over a time period, and if a maximum threshold is exceeded, an appropriate adjustment may be made to throttle down usage of the resource by the virtual partition assigned the performance policy being violated. If, for example, CPU utilization or DA utilization by a virtual partition exceeds the threshold, the data storage system may use scheduling techniques to delay executing a host task using the CPU, delay reading/writing data to physical devices using the DA, and the like. If a request for cache by a consumer of a virtual partition would exceed the virtual partition's cache threshold of the assigned performance policy, the request may be delayed until additional cache resources currently allocated for use by the virtual partition are deallocated or freed. Of course, different techniques may be used to avoid situations such as deadlock, starvation, and the like, as related to resource allocation and contention issues.

A performance policy for a virtual partition may specify an upper bound threshold such as, for example, for an amount of I/Os per second or throughput. If, for a defined time period, the observed throughput for the virtual partition exceeds the threshold, an embodiment may perform any one or more different techniques to throttle down actual throughput for the virtual partition. For example, different techniques that may be used in connection with setting and controlling data storage system performance are described in U.S. Pat. No. 7,739,470, (the '470 patent) issued Jun. 15, 2010, LIMIT ALGORITHM USING QUEUE DEPTH TO CONTROL APPLICATION PERFORMANCE, to Norgren, assigned to EMC Corporation, which is incorporated by reference herein, and U.S. Pat. No. 7,757,013, (the '013 patent) issued Jul. 13, 2010, TECHNIQUES FOR CONTROLLING DATA STORAGE SYSTEM PERFORMANCE, to Lawson et al., assigned to EMC Corporation, which is incorporated by reference herein, discuss setting and enforcing performance goals of a policy, monitoring current performance, and techniques to enforce such performance goals. Thus, in connection with specifying performance thresholds in a performance policy (e.g., for performance metrics and/or resources of the performance policy), the threshold may also be a target threshold so that techniques such as described in the '470 and '013 patents may be used to try and maintain a target threshold within a given tolerance, where such tolerance may be specified using a window defined using minimum and maximum thresholds. For example, the performance policy for a virtual partition may be any of a number of performance goals (e.g., response time, bandwidth, I/O throughput) as described in the '470 and '013 patents and techniques described therein may be applied to attain such goals for the assigned virtual partition.

When enforcing a performance policy, a combination of values in a policy may not make sense or may not otherwise be attainable. For example, a single partition's performance policy may have, for example, a first threshold which is at odds with a second threshold. As another example, for a particular data storage system configuration, the virtual partition may never achieve a minimum or target I/O throughput limit or response time. Additionally, as the configuration of the data storage system changes, the capabilities of the system also changes (e.g., as add more devices, more cache or memory) and one may have to accordingly adjust performance policy values based on the updated system configuration. Software tools and techniques such as, for example, described in the '470 and '013 patents, may be applied to determine realistic candidate or potential values for virtual partition performance, and observe current system and virtual partition and data storage system performance when such candidate performance policies are enforced (e.g., using modeling and/or estimates of such performance based on defined assumptions or conditions, running the candidate performance policies enforced for a trial period, and the like).

As described herein, a performance policy for a virtual partition may specify one or more thresholds for a performance metric (e.g., such as throughput, response time or bandwidth) that is dependent on multiple data storage system resources (CPU, memory, etc.) used to process an I/O. Thus the performance policy may specify limits or thresholds each based on a single resource (e.g. physical resource like CPU, memory, cache, DA) or where each may be dependent on multiple resources reflecting an implied usage of underlying data storage system resources used, for example, to process an I/O operation.

It should also be noted that in connection with keeping within specified performance policy limits such as for performance metrics, an embodiment may further vary and select amounts of each storage tier utilized subject, of course, to any limits in the allocation policy. It may be further necessary to select amounts of storage tiers used for storing data of a virtual partition as one way to regulate or control performance of the virtual partition to be within the limits of the performance policy. This is because performance of a storage tier is one factor that affects performance, such as overall performance of the virtual partition, data storage system, and the like. For example, the virtual partition may not be able to achieve a minimum or target I/O throughput limit or response time using a first amount of flash tier storage. However, increasing the first amount to a second amount (where the second amount is within the limits of the partition's allocation policy) provides for increasing virtual partition performance as may be determined by a measured value for response time and/or I/O throughput. Thus, varying amounts of each storage tier utilized (subject to any specified allocation policy) may provide another way for achieving goals or keeping within limits of a performance policy. Such amounts may be determined and varied, for example, automatically by the data storage system in accordance with making adjusted for keeping within a defined performance policy.

In addition to that as described above, it should be noted that an embodiment may further allow a virtual partition to be further divided into other virtual sub-partitions of the virtual partition manager wherein each of the virtual sub-partitions may have its own set of policies in effect in a manner similar to those as described herein for each virtual partition. Each virtual partition manner may further create one or more virtual sub-partitions having an access control policy, storage allocation policy and/or performance policy which are inherited from the parent virtual partition by default. The virtual partition manager may further define virtual sub-partition policies having limits within those of the containing or parent virtual partition.

Figure 16:
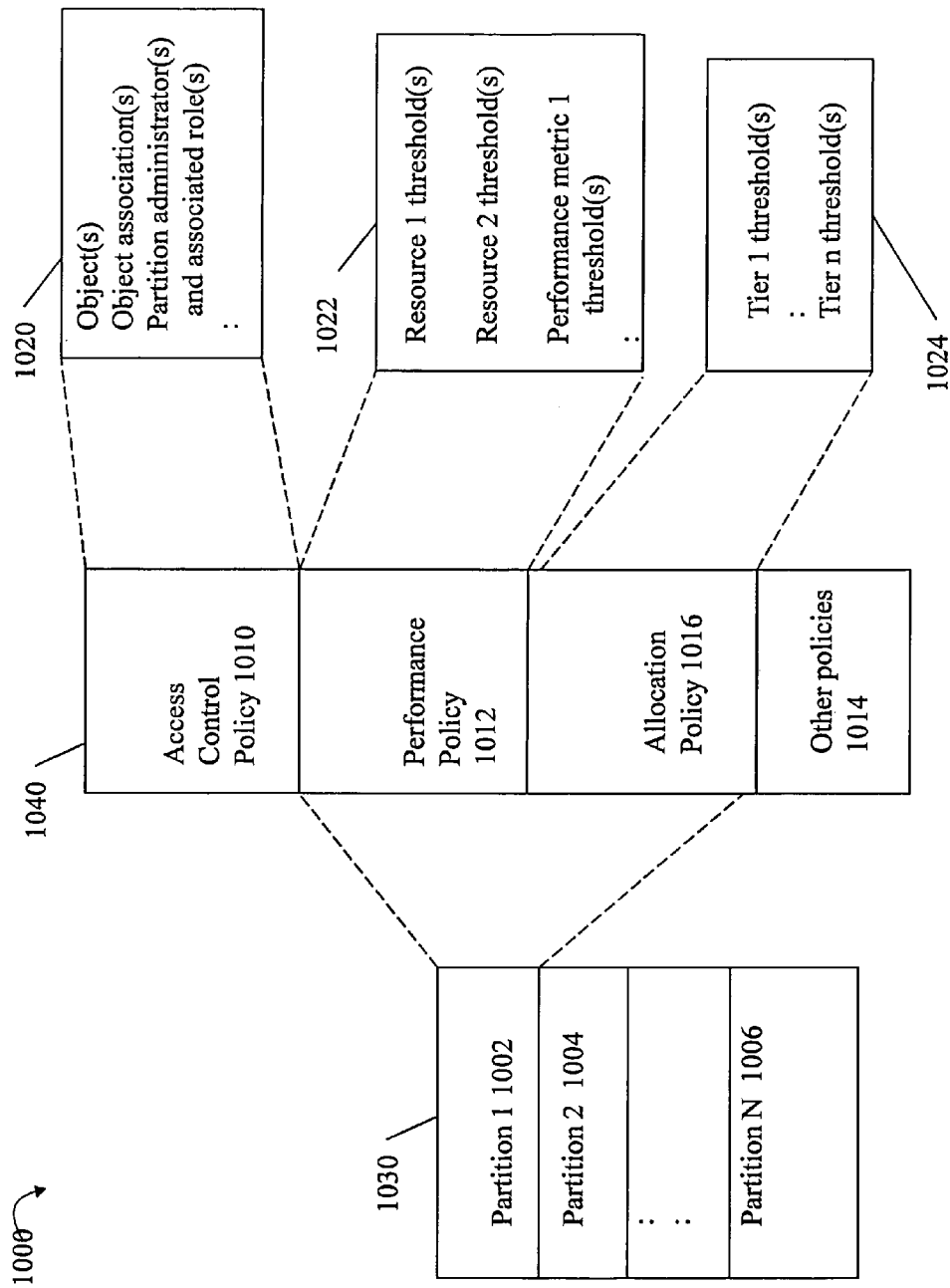

Referring to FIG. 16, shown is an example providing a generalized representation of a set of policies that may be defined for each virtual partition in an embodiment in accordance with techniques herein. The example 1000 includes a list 1030 of defined virtual partitions 1002-1006. The particular limit or number of partitions in 1030 may vary with embodiment. For each partition of 1030, a set of one or more policies 1040 (including policies denoted by 1010, 1012, 1014 and 1016) may be defined. It should be noted that although the example 1000 illustrates the set 1040 for only virtual partition 1002, a set of policies denoted by 1040 may be defined and assigned to each of the partitions of 1030. The set of policies 1040 assigned to partition 1002 may include an access control policy 1010, a performance policy 1012, an allocation or storage allocation policy 1016, and one or more other policies 1014 as may be included in an embodiment. Element 1020 illustrates some of the information that may be included in an access control policy such as objects and object associations for a virtual partition, the different virtual partition administrators/users and associated roles, any sub-partition information, and the like, as described elsewhere herein in more detail. Element 1022 illustrates some information than may be included in a performance policy such as one or more thresholds for data storage system resources and one or more thresholds for performance metrics such as described elsewhere herein in more detail. Element 1024 illustrates some information that may be included in a storage allocation policy such as one or more threshold amounts or limits for each storage tier in a multi-tiered storage system such as described elsewhere herein in more detail.

Figure 17:
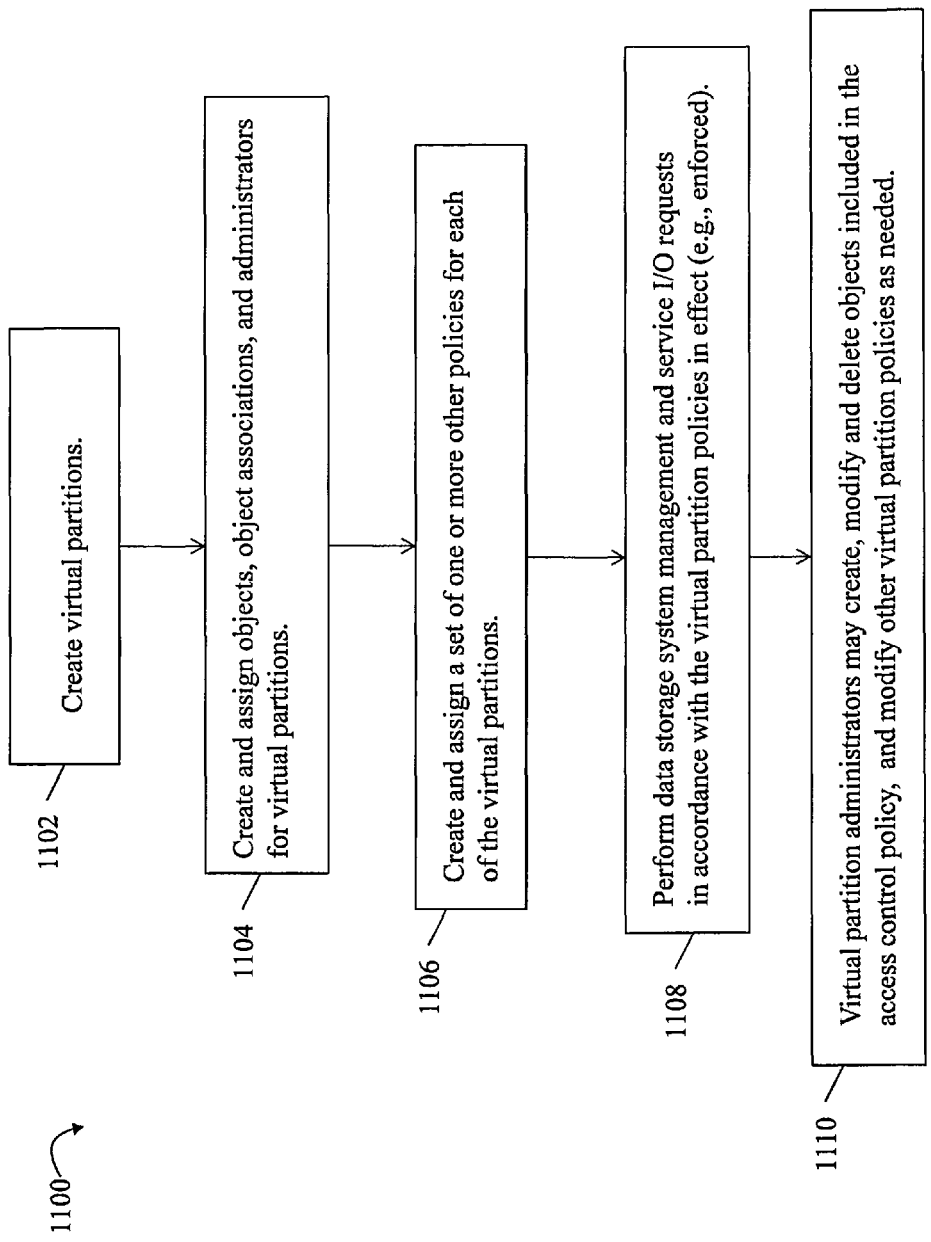
FIG. 17 is a flowchart of processing steps that may be performed in an embodiment in accordance with techniques herein.

Referring to FIG. 17, shown is a flowchart of processing steps that may be performed in an embodiment in accordance with techniques herein. The flowchart 1100 summarizes processing described above. In step 1102, a data storage global administrator may create one or more virtual partitions. In step 1104, the global administrator may create and assign objects (e.g., representing data storage system resources and consumers of such resources) to the virtual partitions, may create associations between objects, may create and assign administrators to the virtual partitions, and the like, as described above. Operations in connection with step 1104 may be characterized as specifying portions of an access control policy for each of the virtual partitions. At step 1106, the global administrator may create and assign a set of one or more other policies to each of the virtual partitions. Step 1106 may include creating and assigning a performance policy and storage allocation policy to each of the virtual partitions. In step 1108, data storage system management and servicing of I/O requests may be performed in accordance with the virtual partition policies in effect (e.g., enforced). At step 1110, the virtual partition administrators may create, modify and/or delete objects included in and in accordance with the access control policy, and also modify other virtual partition policies as needed (e.g., such as due to changes in data storage system configuration).

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of performing data storage system management comprising:
    dividing a data storage system into a plurality of virtual partitions;
    specifying a plurality of policy sets, each of said policy sets including one or more policies; and
    assigning one of said plurality of policy sets to each of said plurality of virtual partitions, wherein each of said plurality of policy sets includes an access control policy that assigns a portion of data storage of the data storage system as a resource for exclusive use in one of the plurality of virtual partitions that is assigned said each policy set, wherein objects assigned to each of the plurality of virtual partitions include a first object set representing resources assigned to said each virtual partition for use by said each virtual partition and a second object set representing consumers assigned to said each virtual partition, wherein for a consumer of said each virtual partition to have access to a resource represented by a first object of said each virtual partition, the consumer is assigned to the first object.

2. The method of claim 1, wherein each access control policy identifies one or more objects representing storage devices of the data storage system for exclusive use in said one of the plurality of virtual partitions.

3. The method of claim 2, wherein each of the one or more objects represents any of a logical storage device, a physical storage device, a storage pool of one or more physical devices, and a storage group of one or more logical storage devices.

4. The method of claim 1, wherein each of the plurality of virtual partitions has one of a plurality of partition administrators that performs data storage management only for resources assigned to said each virtual partition, wherein a first access control policy of a first of the plurality of policy sets assigns a first portion of data storage to a first of said plurality of virtual partitions and a second access control policy of a second of the plurality of policy sets assigns a second portion of data storage to a second of said plurality of virtual partitions, and wherein a first partition administrator for the first of the plurality of virtual partitions being allowed to perform data storage management of the first portion and being allowed no access to perform operations on the second portion, a second partition administrator for the second virtual partition being allowed to perform data storage management of the second portion and being allowed no access to perform operations on the first portion.

5. The method of claim 4, wherein a global data storage administrator having access to all data storage of the data storage system performs said dividing, said specifying and said assigning.

6. The method of claim 4, wherein each of a plurality of data storage administrators is assigned a role including any of a manager, a monitor, and a replicator.

7. The method of claim 1, wherein the data storage system is a single physical data storage array.

8. The method of claim 1, wherein the data storage system includes a plurality of data storage arrays.

9. A method of performing data storage system management comprising:
    dividing a data storage system into a plurality of virtual partitions;
    specifying a plurality of policy sets, each of said policy sets including one or more policies; and
    assigning one of said plurality of policy sets to each of said plurality of virtual partitions, wherein each of said plurality of policy sets includes an access control policy that assigns a portion of data storage of the data storage system as a resource for exclusive use in one of the plurality of virtual partitions that is assigned said each policy set, and
    wherein each of the plurality of virtual partitions has one of a plurality of partition administrators that performs data storage management only for resources assigned to said each virtual partition, wherein a first access control policy of a first of the plurality of policy sets assigns a first portion of data storage to a first of said plurality of virtual partitions and a second access control policy of a second of the plurality of policy sets assigns a second portion of data storage to a second of said plurality of virtual partitions, and wherein a first partition administrator for the first of the plurality of virtual partitions being allowed to perform data storage management of the first portion and being allowed no access to perform operations on the second portion, a second partition administrator for the second virtual partition being allowed to perform data storage management of the second portion and being allowed no access to perform operations on the first portion, and wherein each of a plurality of data storage administrators is assigned a role including any of a manager, a monitor, and a replicator, and wherein a manager of a partition is allowed to provision storage from a storage pool assigned to the partition in order to create logical devices for the partition, is allowed to create storage groups for the partition from logical devices of the partition, and is allowed to assign a data storage client of the partition to a first storage group of logical devices thereby allowing the data storage client to perform data storage operations to store and retrieve data from the first storage group, wherein a monitor of the partition is only allowed to view information regarding assigned objects of the partition and is not allowed to perform other operations on assigned objects of the partition, and wherein a replicator of the partition is only allowed to perform replication operations on assigned data storage of the partition.

10. A method of performing data storage system management comprising:

dividing a data storage system into a plurality of virtual partitions;

specifying a plurality of policy sets, each of said policy sets including one or more policies; and assigning one of said plurality of policy sets to each of said plurality of virtual partitions, wherein each of said plurality of policy sets includes an access control policy that assigns a portion of data storage of the data storage system as a resource for exclusive use in one of the plurality of virtual partitions that is assigned said each policy set, and wherein each of said plurality of policy sets includes a performance policy that assigns one or more performance limits for controlling use of data storage system resources by consumers of one of the plurality of virtual partitions that is assigned said each policy set.

11. The method of claim 10, wherein each performance policy specifies a quantity for a performance-based metric, said quantity representing a performance limit for the performance-based metric that is any of bandwidth, I/O throughput, and response time.

12. The method of claim 11, wherein response time is an average time for an input/output (I/O) request to be serviced by the data storage system including any wait time, bandwidth is an average amount of data in connection with read and/or write I/O requests processed by the data storage system per unit of time, and throughput is an average number of I/O requests serviced by the data storage system per unit of time.

13. The method of claim 10, wherein each performance policy includes one or more thresholds of a first resource, each of said one or more thresholds specifying a resource limit for the first resource which is any of processor utilization, memory, and cache.

14. The method of claim 10, wherein the data storage system includes a plurality of storage tiers, wherein each of said plurality of storage tiers includes physical storage devices of the data storage system having different physical storage performance characteristics, and wherein each of the plurality of policy sets includes a storage allocation policy that specifies one or more threshold amounts for each of the plurality of storage tiers for use by a virtual partition assigned said storage allocation policy.

15. The method of claim 14, wherein the plurality of storage tiers includes a first tier of flash drives, and one or more tiers of disk drives.

16. The method of claim 10, wherein each performance policy is assigned a predetermined quality of service level, and wherein each performance policy specifies one or more threshold amounts that are used as said one or more performance limits and are determined in accordance with the predetermined quality of service level.

17. A non-transitory computer readable medium comprising code stored thereon for performing data storage system management, the non-transitory computer readable medium comprising code for:

dividing a data storage system into a plurality of virtual partitions;

specifying a plurality of policy sets, each of said policy sets including one or more policies; and assigning one of said plurality of policy sets to each of said plurality of virtual partitions, wherein each of said plurality of policy sets includes an access control policy that assigns a portion of data storage of the data storage system as a resource for exclusive use in one of the plurality of virtual partitions that is assigned said each policy set, wherein objects assigned to each of the plurality of virtual partitions include a first object set representing resources assigned to said each virtual partition for use by said each virtual partition and a second object set representing consumers assigned to said each virtual partition, wherein for a consumer of said each virtual partition to have access to a resource represented by a first object of said each virtual partition, the consumer is assigned to the first object.

18. The non-transitory computer readable medium of claim 17, wherein each access control policy identifies one or more objects representing storage devices of the data storage system for exclusive use in said one of the plurality of virtual partitions that is assigned said each policy set.

19. The non-transitory computer readable medium of claim 18, wherein each of the one or more objects represents any of a logical storage device, a physical storage device, a storage pool of one or more physical devices, and a storage group of one or more logical storage devices.

* * * * *